(12) United States Patent
Hinatsu

(10) Patent No.: US 12,468,795 B2
(45) Date of Patent: Nov. 11, 2025

(54) BIOMETRIC AUTHENTICATION DEVICE, BIOMETRIC AUTHENTICATION METHOD, AND COMPUTER READABLE MEDIUM

(71) Applicant: Mitsubishi Electric Corporation, Tokyo (JP)

(72) Inventor: Shun Hinatsu, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 72 days.

(21) Appl. No.: 18/649,618

(22) Filed: Apr. 29, 2024

(65) Prior Publication Data
US 2024/0281511 A1    Aug. 22, 2024

Related U.S. Application Data

(63) Continuation of application No. PCT/JP2021/048268, filed on Dec. 24, 2021.

(51) Int. Cl.
*G06F 21/00* (2013.01)
*G06F 21/32* (2013.01)

(52) U.S. Cl.
CPC .................... *G06F 21/32* (2013.01)

(58) Field of Classification Search
CPC .......................................................... G06F 21/32
See application file for complete search history.

(56) References Cited

U.S. PATENT DOCUMENTS

2008/0212846 A1* 9/2008 Yamamoto ............. G06V 10/75
                                                              382/115
2015/0135310 A1  5/2015 Lee
(Continued)

FOREIGN PATENT DOCUMENTS

JP    2003-58269 A     2/2003
JP    2006-221563 A    8/2006
(Continued)

OTHER PUBLICATIONS

International Search Report for PCT/JP2021/048268 mailed on Mar. 15, 2022.
(Continued)

*Primary Examiner* — William A Corum, Jr.
(74) *Attorney, Agent, or Firm* — Birch, Stewart, Kolasch & Birch, LLP

(57) ABSTRACT

A measuring unit (21) measures biometric information. An authentication processing unit (22) generates authentication information that differs depending on an individual living body from first biometric information being the biometric information measured by the measuring unit (21), and decides authentication acceptance or nonacceptance on a basis of the authentication information. A continuation processing unit (23) decides about continuation acceptance or nonacceptance of an authentication state with using second biometric information being the biometric information which is measured in the authentication state where authentication acceptance is decided by the authentication processing unit (22). The continuation processing unit (23) decides continuation acceptance or nonacceptance by a method different from a method employed in decision of the authentication acceptance or nonacceptance made by the authentication processing unit (22). A legitimacy verification unit (24) guarantees legitimacy of the biometric information on a basis of results of repeated decisions of the continuation acceptance or nonacceptance made by the continuation processing unit (23).

11 Claims, 28 Drawing Sheets

(56) References Cited

U.S. PATENT DOCUMENTS

| | | | |
|---|---|---|---|
| 2016/0147987 A1* | 5/2016 | Jang | G06V 40/1365 |
| | | | 726/19 |
| 2017/0286648 A1 | 10/2017 | Yamaguchi et al. | |
| 2018/0054435 A1 | 2/2018 | Sakamoto et al. | |
| 2020/0336308 A1 | 10/2020 | Deutschmann et al. | |
| 2021/0374689 A1* | 12/2021 | Bansal | G06Q 20/02 |
| 2022/0269765 A1 | 8/2022 | Hinatsu et al. | |
| 2022/0292172 A1* | 9/2022 | Sims | G06V 40/1359 |

FOREIGN PATENT DOCUMENTS

| | | |
|---|---|---|
| JP | 2014-119830 A | 6/2014 |
| JP | 2017-58749 A | 3/2017 |
| JP | 2017-140070 A | 8/2017 |
| JP | 2018-28786 A | 2/2018 |
| JP | 6461516 B2 | 1/2019 |
| JP | 2019-40404 A | 3/2019 |
| JP | 2020-60904 A | 4/2020 |
| JP | 6824478 B1 | 2/2021 |
| JP | 2021-47857 A | 3/2021 |
| JP | 2021-72882 A | 5/2021 |
| WO | WO 2018/198286 A1 | 11/2018 |
| WO | WO 2021/140588 A1 | 7/2021 |

OTHER PUBLICATIONS

Murao, "Technology to modify biometric measurement using a wearable device", Innovation Japan 2020, Ritsumeikan University, https://www.ritsumei.ac.jp/features/innovation/research/index_08.html/.

German Office Action for German Application No. 11 2021 008 385.6, dated Jun. 13, 2025, with English translation.

\* cited by examiner

Fig. 2

| USER NAME OR ID | ACQUISITION DATE AND TIME | FIRST FEATURE | SECOND FEATURE | AUTHENTICATION/ CONTINUATION | ... |
|---|---|---|---|---|---|
| A01 | 2020/11/5 08:11:13 | 3.79 | 25 | AUTHENTICATION | ... |
| A01 | 2021/11/5 20:11:28 | 3.84 | 28 | CONTINUATION | ... |
| B02 | 2021/10/5 15:14:24 | 2.86 | 31 | AUTHENTICATION | ... |
| B02 | 2022/11/5 12:36:40 | 3.00 | 18 | CONTINUATION | ... |
| ... | ... | ... | ... | | ... |

Fig. 6
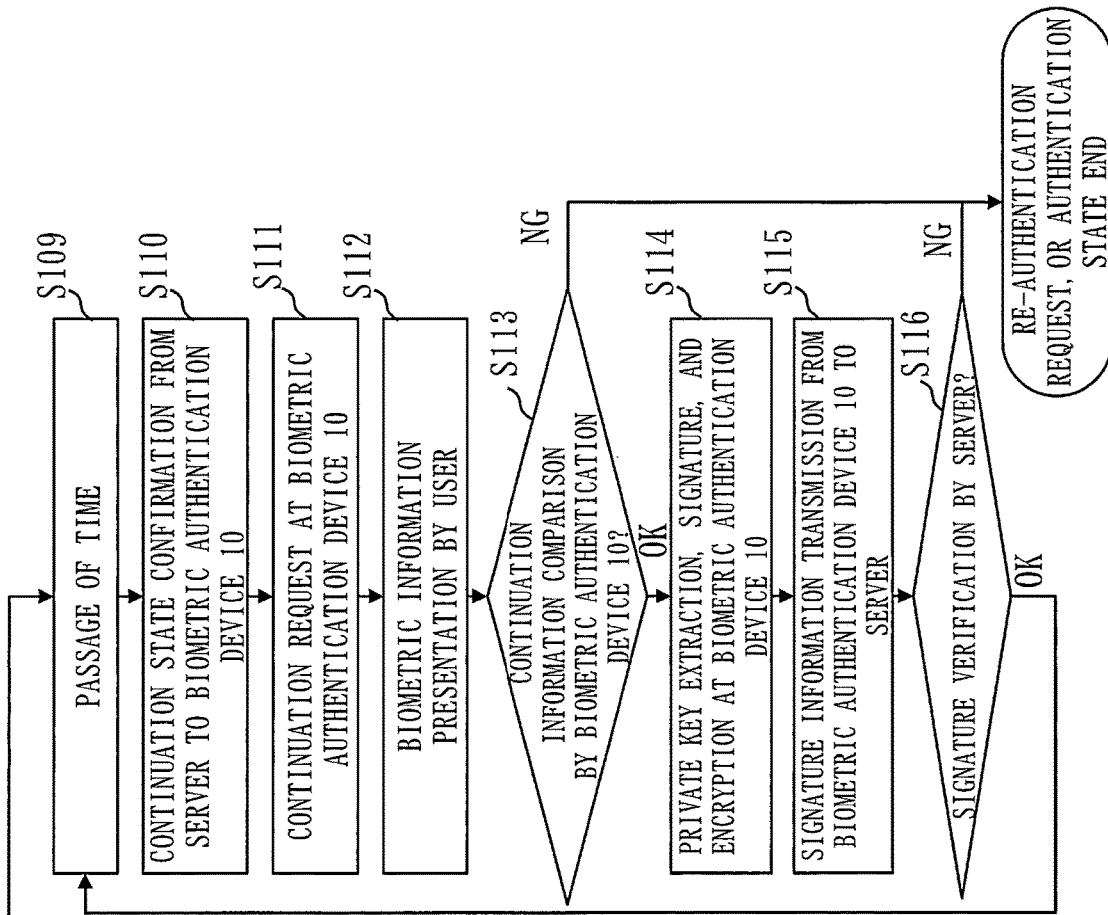
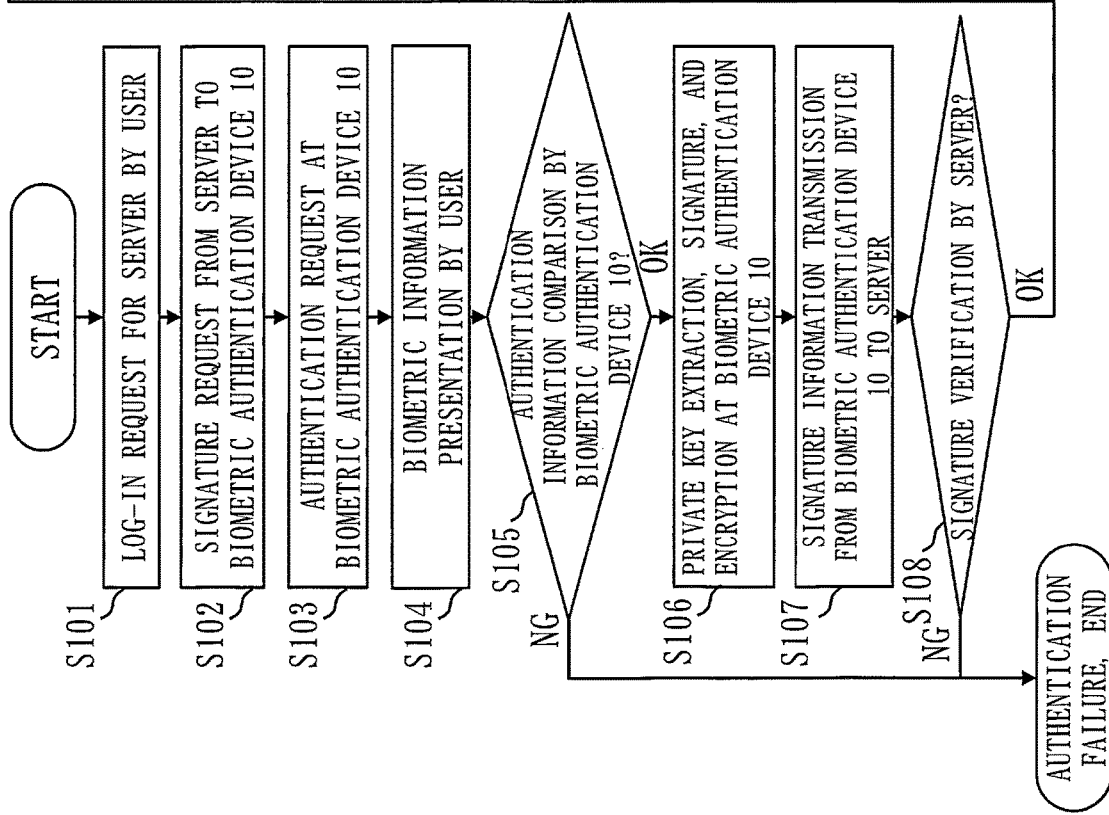

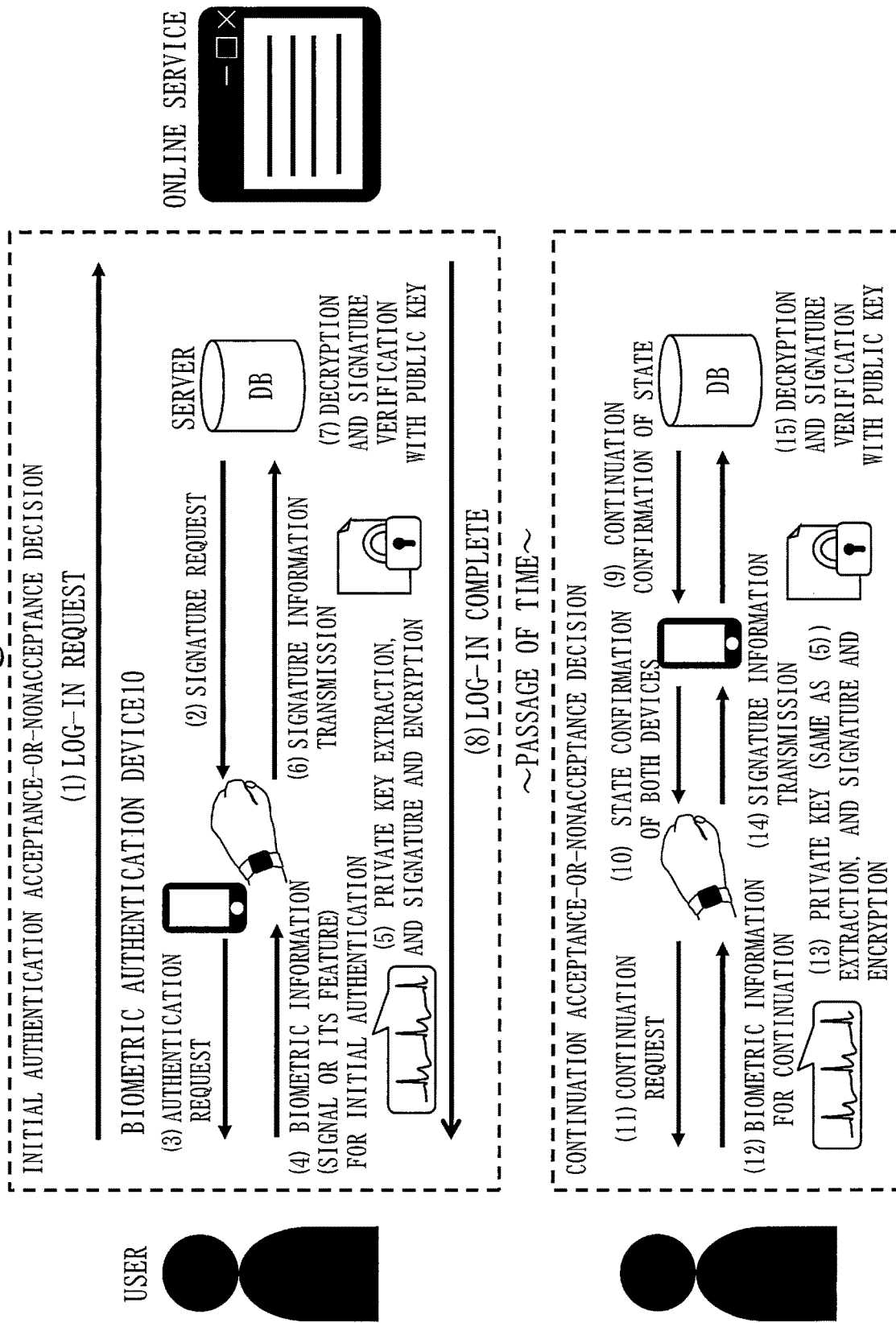

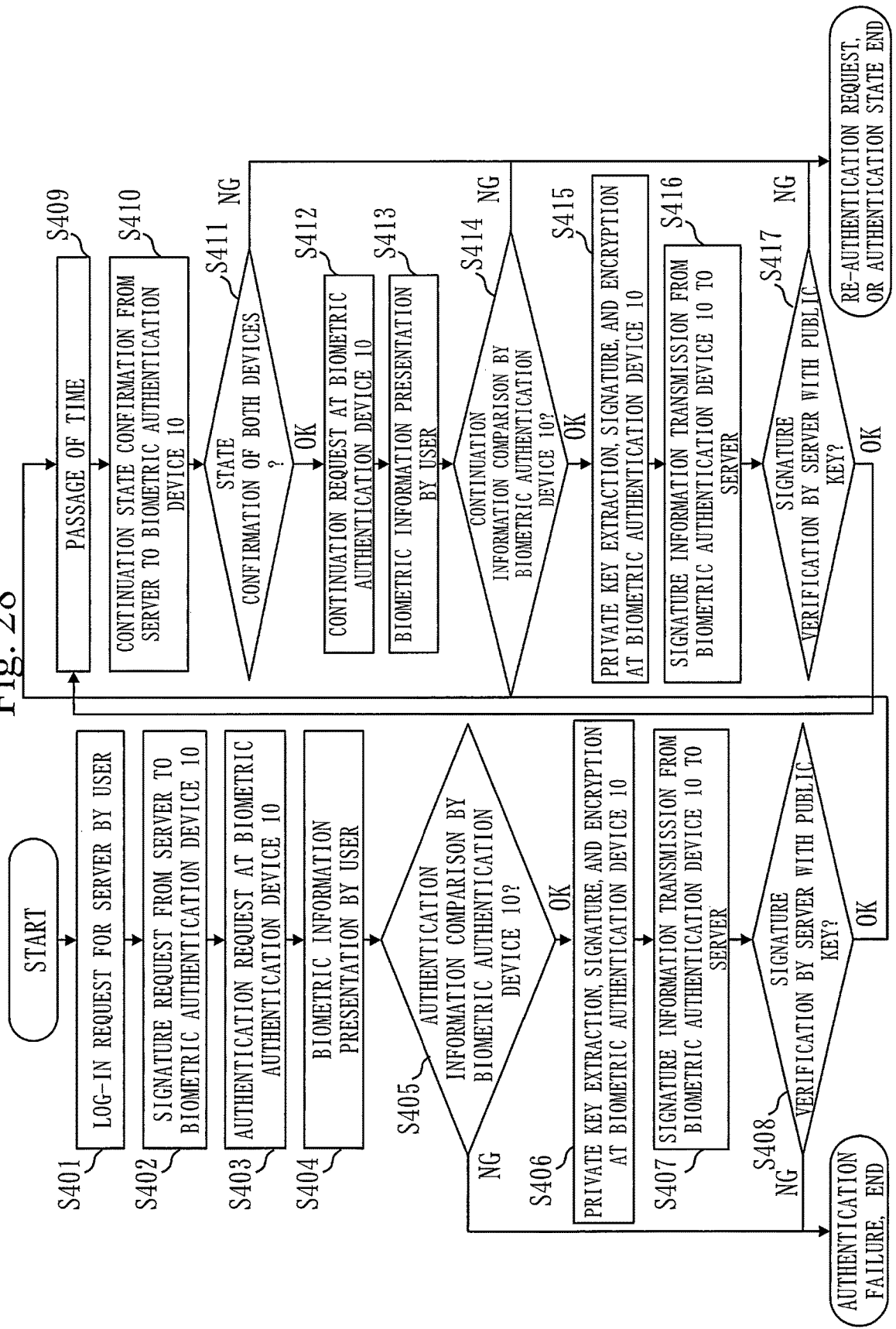

BIOMETRIC AUTHENTICATION DEVICE, BIOMETRIC AUTHENTICATION METHOD, AND COMPUTER READABLE MEDIUM

CROSS REFERENCE TO RELATED APPLICATION

This application is a Continuation of PCT International Application No. PCT/JP2021/048268, filed on Dec. 24, 2021, which is hereby expressly incorporated by reference into the present application.

TECHNICAL FIELD

The present disclosure relates to a technique of performing continuous authentication on a basis of biometric information.

BACKGROUND ART

Measurement devices that measure biometric information are becoming popular. Along with this, biometric information is becoming used more and more. For example, services based on an authentication technique such as face authentication and fingerprint authentication and services based on health information such as health promotion type insurance have been realized or studied.

A measurement device or the above-mentioned services may be exposed to spoofing or fraudulent profit acquisition. For example, after a legitimate user is authenticated, when the user leaves seat or the measurement device is removed, an attacker may use the measurement device. Also, biometric information to be inputted to the measurement device may be artificially generated or altered, and profits may be fraudulently acquired from an insurance company.

Therefore, a technology that continuously authenticates the measurement device or the user of the above-mentioned service and guarantees legitimacy of the biometric information is needed.

Biometric authentication consists of the following steps: (1) measurement with a sensor, (2) feature extraction, and (3) registration to a template and comparison with the template.

Currently, FIDO, which is an authentication technique using public key cryptography, is popular. FIDO stands for Fast IDentity Online. Use of FIDO is advantageous in that confidential information such as a private key, biometric information, and PIN is not transmitted to the outside. PIN stands for Personal Identification Number. However, to continuously perform authentication using FIDO, it is necessary to input biometric information such as a fingerprint, or PIN repeatedly. This makes the user to take trouble to input information.

There is also biological information that can be acquired with a measurement device without the user being aware of it. By using such biometric information, continuous authentication can be achieved without requiring the user to take trouble to input information. However, some biological information changes as time passes, as the user gets exercise, and so on. Therefore, sometimes it may be difficult to perform continuous authentication by simply using biometric information.

Patent Literature 1 describes continuous authentication using biometric information that can be acquired without the user being aware of it. In Patent Literature 1, biological information acquired the last time is employed as a template, and the template and acquired biological information are compared with each other. If a difference from the template is equal to or smaller than a tolerance value, authentication is accepted. By using the biometric information acquired the last time as the template, authentication can be accepted even after the biometric information has changed over time, as the user gets exercise, and so on.

Non-Patent Literature 1 describes how an attacker gradually alters biometric information by applying stimulation to a user's body.

CITATION LIST

Patent Literature

Patent Literature 1: Japanese Patent No. 6824478

SUMMARY OF INVENTION

Technical Problem

Assume that biometric information is altered little by little by an attacker, as described in Non-Patent Literature 1. Then, if the biometric information acquired the last time is used as a template, as described in Patent Literature 1, even when an attacker has altered the biometric information, authentication will be performed. As a result, altered, illegitimate biometric information is accepted.

The present disclosure has as its objective to decide continuation acceptance or nonacceptance of an authentication state using biometric information, and to make it possible to guarantee legitimacy of the biometric information.

Solution to Problem

A biometric authentication device according to the present disclosure includes:
  a measuring unit to measure biometric information;
  an authentication processing unit to generate authentication information that differs depending on an individual living body from first biometric information being the biometric information measured by the measuring unit, and to decide authentication acceptance or nonacceptance on a basis of the authentication information;
  a continuation processing unit to decide about continuation acceptance or nonacceptance by a method different from a method employed in decision of the authentication acceptance or nonacceptance made by the authentication processing unit, the continuation processing unit repeatedly making decision about the continuation acceptance or nonacceptance of an authentication state, with using second biometric information being the biometric information which is measured in the authentication state where authentication acceptance is decided by the authentication processing unit; and
  a legitimacy verification unit to guarantee legitimacy of the biometric information on a basis of results of repeated decisions of the continuation acceptance or nonacceptance made by the continuation processing unit.

Advantageous Effects of Invention

In the present disclosure, continuation acceptance or nonacceptance is decided by a method different from a method employed in authentication acceptance-or-nonacceptance decision made by an authentication processing unit, using second biometric information measured in an authentication state. Hence, if biometric information, used in acceptance-or-nonacceptance decision made by the authentication processing unit, is altered by an attacker, it is possible to prevent continuation of the authentication state. As a result, it is possible to decide continuation acceptance or nonacceptance of the authentication state using the biometric information, and to guarantee legitimacy of the biometric information.

BRIEF DESCRIPTION OF DRAWINGS

FIG. 2 is an explanatory diagram of a database according to Embodiment 1.

FIG. 6 is a flowchart of the processing of the biometric authentication device 10 according to Embodiment 1.

FIG. 27 is an explanatory diagram of processing of the biometric authentication device 10 according to Embodiment 4.

FIG. 28 is a flowchart of the processing of the biometric authentication device 10 according to Embodiment 4.

DESCRIPTION OF EMBODIMENTS

Embodiment 1

*Description of Configuration*

Figure 1:
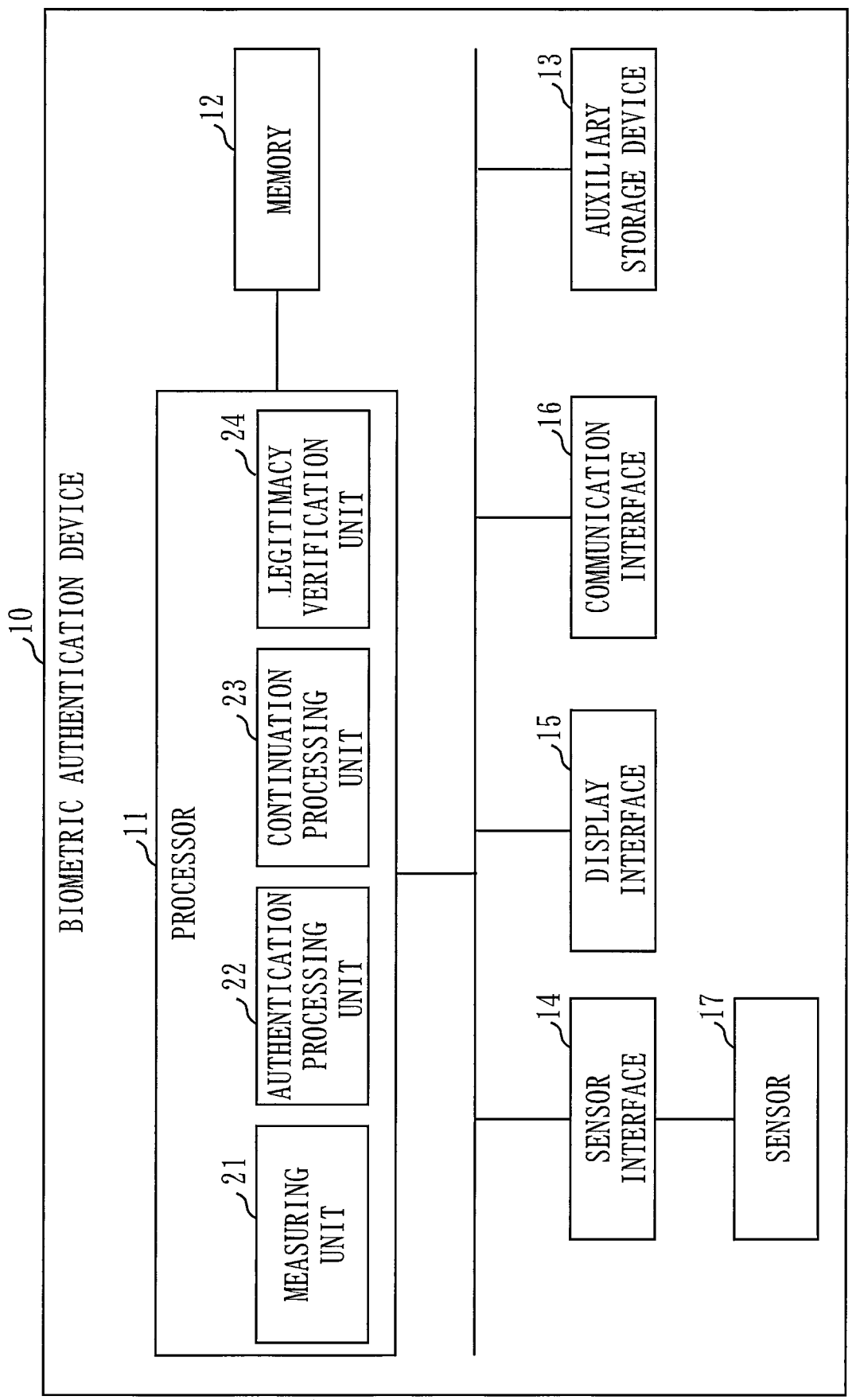
FIG. 1 is a configuration diagram of a biometric authentication device 10 according to Embodiment 1.

A configuration of a biometric authentication device 10 according to Embodiment 1 will be described with referring to FIG. 1.

The biometric authentication device 10 is a computer. The biometric authentication device 10 is a wearable device such as a smart clothing, a smart watch, and smart glasses, which is provided with a sensor that can acquire biometric information. Alternatively, the biometric authentication device 10 may be a mobile device such as a smartphone and a tablet terminal. Alternatively, the biometric authentication device 10 may be a stationary device provided with a camera or the like.

The biometric authentication device 10 is provided with a processor 11, a memory 12, an auxiliary storage device 13, a sensor interface 14, a display interface 15, and a communication interface 16. The processor 11 is connected to the other hardware devices via a signal line and controls the other hardware devices.

The processor 11 is an IC that performs processing. Note that IC stands for Integrated Circuit. Specific examples of the processor 11 are a CPU, a DSP, and a GPU. Note that CPU stands for Central Processing unit, DSP stands for Digital Signal Processor, and GPU stands for Graphics Processing Unit.

The memory 12 is a storage device that stores data temporarily. Specific examples of the memory 12 are an SRAM and a DRAM. Note that SRAM stands for Static Random-Access Memory, and DRAM stands for Dynamic Random-Access Memory.

The auxiliary storage device 13 is a storage device that keeps data. A specific example of the auxiliary storage device 13 is an HDD. Note that HDD stands for Hard Disk Drive. The auxiliary storage device 13 may be a portable recording medium such as an SD (registered trademark) memory card, a CompactFlash (registered trademark), a NAND flash, a flexible disk, an optical disk, a compact disk, a Blu-ray (registered trademark) disc, and a DVD. Note that SD stands for Secure Digital, and DVD stands for Digital Versatile Disk.

The sensor interface 14 is an interface to communicate with a sensor 17. The sensor 17 is a device that acquires biometric information of a user. A specific example of the sensor interface 14 is a USB port. Note that USB stands for Universal Serial Bus.

In FIG. 1, the biometric authentication device 10 is provided with the sensor 17. However, the sensor 17 may be provided outside of the biometric authentication device 10.

The display interface 15 is an interface to communicate with a display that displays processing result information and so on. A specific example of the display interface 15 is an HDMI (registered trademark) port. Note that HDMI stands for High-Definition Multimedia Interface.

The communication interface 16 is an interface to communicate with an external device. A specific example of the communication interface 16 is an Ethernet (registered trademark) port or a wireless communication antenna.

In FIG. 1, the sensor 17 is connected to the processor 11 via the sensor interface 14. However, the sensor 17 may be provided outside of the biometric authentication device 10 and connected to the processor 11 by wireless communication. In that case, the sensor 17 is connected to the processor 11 via the communication interface 16.

The biometric authentication device 10 is provided with a measuring unit 21, an authentication processing unit 22, a continuation processing unit 23, and a legitimacy verification unit 24 as function constituent elements. Functions of the individual function constituent elements of the biometric authentication device 10 are implemented by software.

A program that implements the functions of the individual function constituent elements of the biometric authentication device 10 is stored in the auxiliary storage device 13. This program is read into the memory 12 by the processor 11 and run by the processor 11. As a result, the functions of the individual function constituent elements of the biometric authentication device 10 are implemented.

The memory 12 or the auxiliary storage device 13 implements a database which stores information or the like obtained from biometric information acquired by the sensor 17. For example, as illustrated in FIG. 2, stored in this database are: a first feature and a second feature which are generated from the biometric information; whether authentication acceptance-or-nonacceptance decision has been made; whether continuation acceptance-or-nonacceptance decision has been made; and so on, per user and per acquisition date and time. The above-mentioned database may be implemented by distribution between the memory 12 and the auxiliary storage device 13. FIG. 2 uses a format with which data is stored in a table. However, the format of the database is not limited to this, and NoSQL may be used.

A private key to be used in processing to be described later is stored in the memory 12 or the auxiliary storage device 13.

In FIG. 1, the illustrated processor 11 is only one. However, there may be a plurality of processors 11. The plurality of processors 11 may be linked to each other to run the program that implements the individual functions.

In FIG. 1, the illustrated sensor 17 is only one. However, there may be a plurality of sensors 17. For example, the biometric authentication device 10 may be provided with an acceleration sensor and a temperature sensor as the sensors 17. The biometric authentication device 10 may be provided with two acceleration sensors as the sensors 17.

*Description of Operations*

Operations of the biometric authentication device 10 according to Embodiment 1 will be described with referring to FIGS. 3 to 19.

An operation procedure of the biometric authentication device 10 according to Embodiment 1 corresponds to a biometric authentication method according to Embodiment 1. A program that implements the operations of the biometric authentication device 10 according to Embodiment 1 corresponds to a biometric authentication program according to Embodiment 1.

Figure 3:
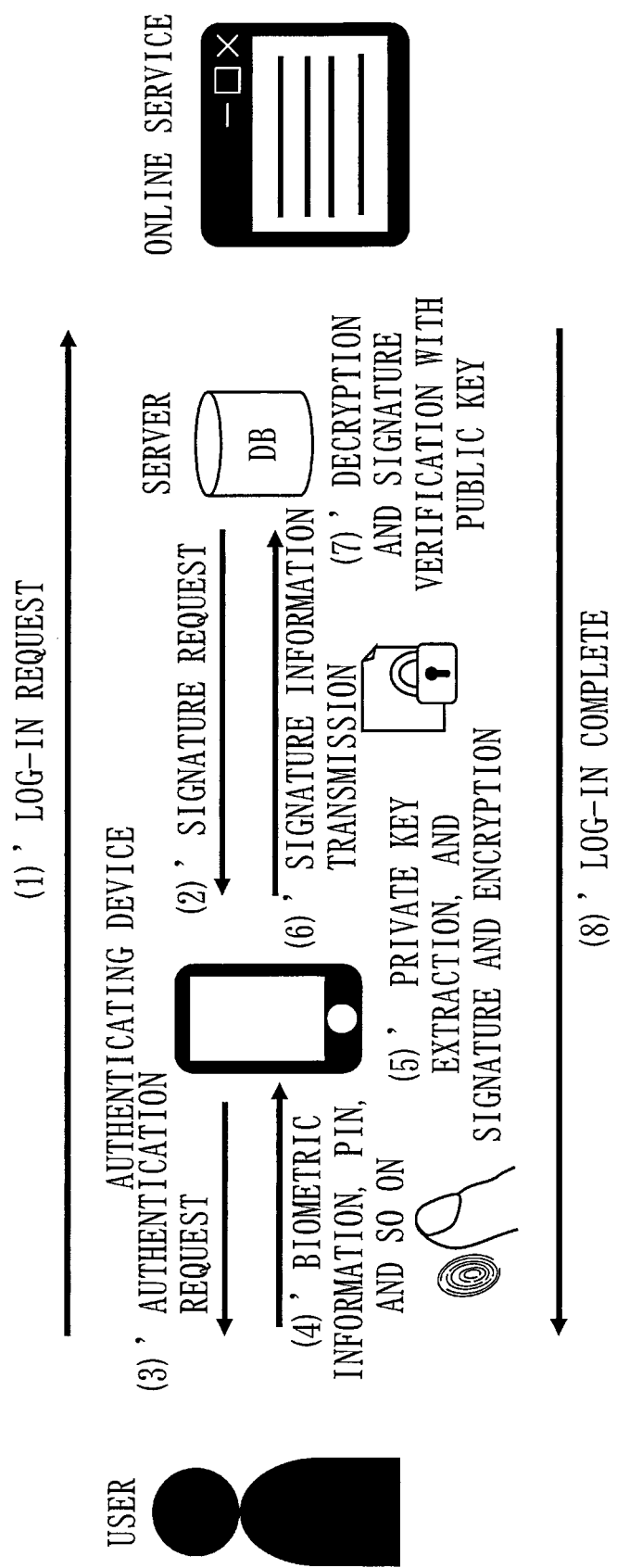
FIG. 3 is an explanatory diagram of authentication processing by existing FIDO.
Figure 4:
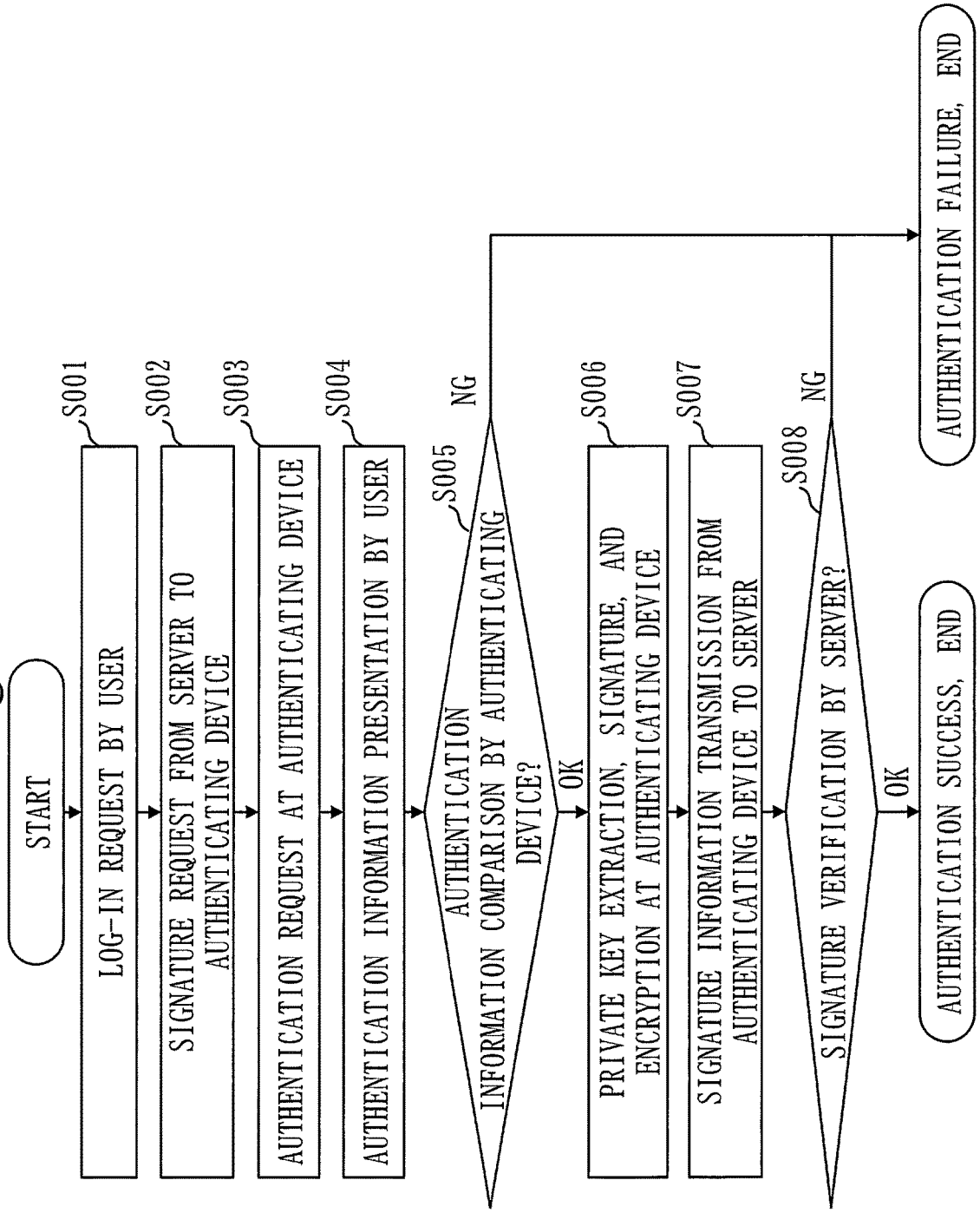
FIG. 4 is a flowchart of the authentication processing by existing FIDO.

Authentication processing by existing FIDO will be described with referring to FIGS. 3 and 4.

The user makes a log-in request for an online service ((1)', S001). A server that provides the online service makes a signature request to an authenticating device ((2)', S002). The authenticating device makes an authentication request to the user ((3)', S003). The user presents authentication information such as biometric information for authentication, PIN, and so on ((4)', S004). The authenticating device compares the authentication information with a template to decide authentication acceptance or nonacceptance (S005). If authentication acceptance is decided (OK in S005), the authenticating device extracts the private key that is held, and performs signature and encryption with the private key in response to the signature request, thus generating signature information ((5)', S006). The authenticating device transmits the signature information to the server ((6)', S007). The server decrypts the signature information with a public key and verifies the signature to confirm that the user is a legitimate user ((7)', S008). Log-in is thus completed ((8)').

Figure 5:
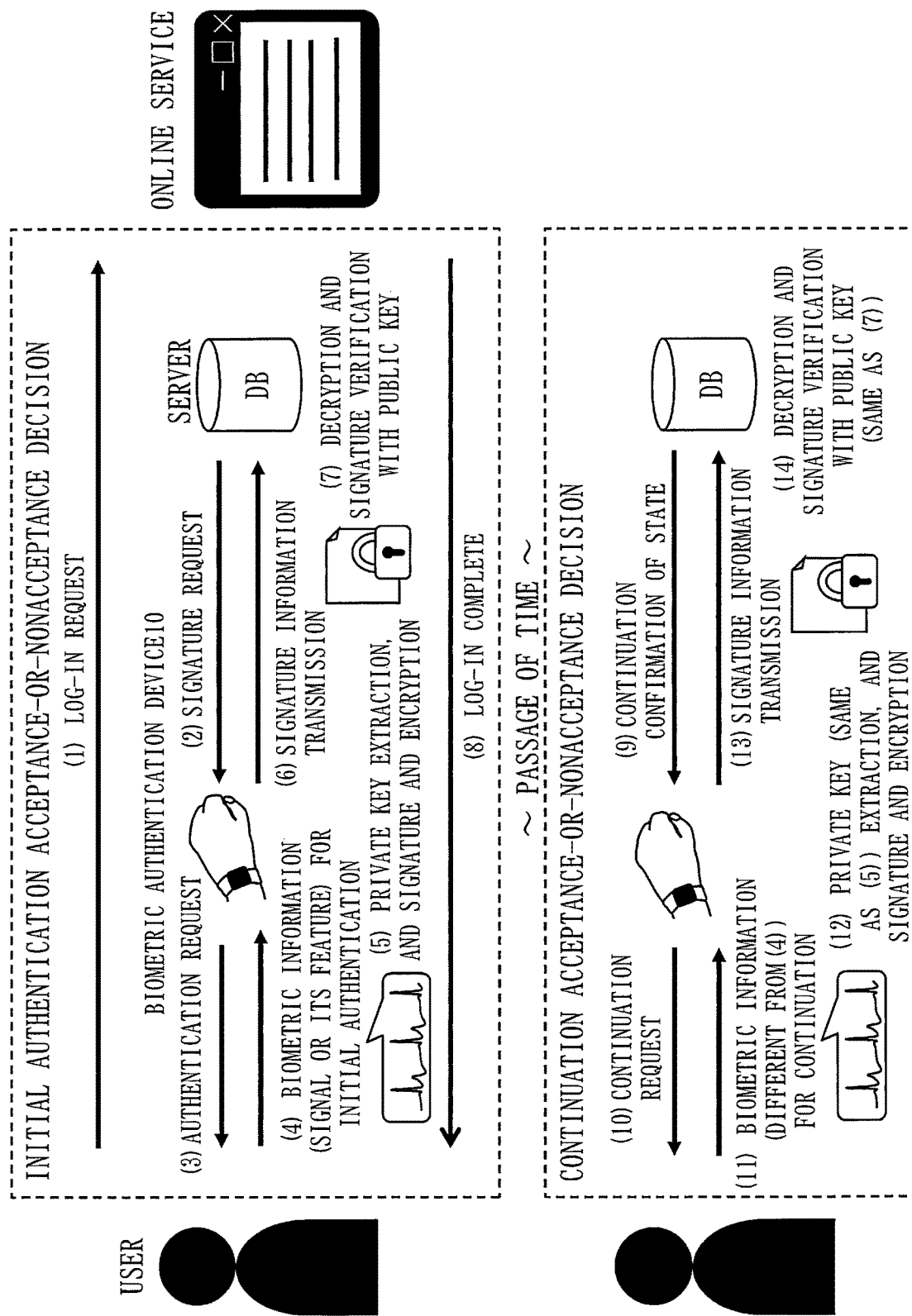
FIG. 5 is an explanatory diagram of processing of the biometric authentication device 10 according to Embodiment 1.

Processing of the biometric authentication device 10 according to Embodiment 1 will be described with referring to FIGS. 5 and 6.

The biometric authentication device 10 changes a decision method in accordance with a number of times of authentication so as to realize continuous user authentication and to guarantee legitimacy of the biometric information being measured.

In Embodiment 1, processing according to FIDO will be described for sake of comparison with popular FIDO. However, an idea to be described below is not limited to extension of FIDO. For example, in Embodiment 1, a pair consisting of a public key and a private key is employed to conform to FIDO that uses public key cryptography. However, a common key may be employed in place of the pair consisting of a public key and a private key.

The user makes a log-in request for the online service ((1), S101). The server that provides the online service makes a signature request to the biometric authentication device 10 ((2), S102). The measuring unit 21 of the biometric authentication device 10 makes an authentication request to the user ((3), S103). The user presents biometric information for initial authentication ((4), S104).

In Embodiment 1, the biometric information is a biometric signal that can be acquired unconsciously and in a time-series manner. Hence, the user's presenting biometric information means that the measuring unit 21 measures biometric information of the user with the sensor 17. Note that the biometric information is not limited to a particular biometric signal. For example, the biometric information is a time-series signal such as a signal of an electrocardiogram, a signal of an electromyogram, a signal of a ballistocardiogram, a signal of a photoplethysmogram, a respiratory signal, and a signal of an electrooculogram. Alternatively, the biometric information may be video images of a face, a fingerprint, or the like which are captured continuously.

The authentication processing unit 22 of the biometric authentication device 10 extracts a feature from first biometric information being the presented biometric information, so as to generate authentication information that differs depending on the individual living body. When generating the authentication information, the authentication processing unit 22 may extract all of the first biometric information as the feature, or part of the first biometric information as the feature. Then, the authentication processing unit 22 decides authentication acceptance or nonacceptance on a basis of the authentication information (S105). Specifically, the authentication processing unit 22 compares the authentication information with a first template being set in advance to decide whether a difference is equal to or smaller than a tolerance. If the difference is equal to or smaller than the tolerance, the authentication processing unit 22 decides authentication acceptance. If the difference is larger than the tolerance, the authentication processing unit 22 decides authentication nonacceptance.

If authentication acceptance is decided (OK in S105), the authentication processing unit 22 of the biometric authentication device 10 extracts the private key that is held, and performs signature and encryption with the private key in response to the signature request, thus generating signature information ((5), S106). The authentication processing unit 22 of the biometric authentication device 10 transmits the signature information to the server ((6), S107). The server decrypts the signature information with the public key and verifies the signature to confirm that the user is a legitimate user ((7), S108). Log-in is thus completed ((8)).

Expediently, the above processing of steps S101 to S108 will be called authentication acceptance-or-nonacceptance decision. However, in the initial authentication acceptance-or-nonacceptance decision, decision with the same contents may be made a plurality of number of times to decide authentication acceptance or nonacceptance. When log-in is completed by the initial authentication acceptance-or-nonacceptance decision, the processing proceeds to the next stage.

A predetermined period of time or a randomly determined period of time passes (S109). Then, the server transmits continuation confirmation about an authentication state to the biometric authentication device 10 ((9), S110). The measuring unit 21 of the biometric authentication device 10 makes a continuation request to the user ((10), S111). The user presents biometric information for continuation ((11), S112).

As described above, in Embodiment 1, the biometric information is a biometric signal that can be acquired unconsciously in a time-series manner. Hence, the user's presenting biometric information means that the measuring unit 21 measures biometric information of the user with the sensor 17.

The continuation processing unit 23 of the biometric authentication device 10 extracts a feature from second feature information which is the presented biometric information so as to generate continuation information. Based on the continuation information, the continuation processing unit 23 decides continuation acceptance or nonacceptance of the authentication state (S113). In this case, the continuation processing unit 23 decides continuation acceptance or nonacceptance by a method different from the method employed in initial authentication acceptance-or-nonacceptance decision made by the authentication processing unit 22.

If continuation acceptance is decided (OK in S113), the continuation processing unit 23 of the biometric authentication device 10 extracts the private key that is held, and performs signature and encryption with the private key in response to the signature request, thus generating signature information ((12), S114). The continuation processing unit 23 of the biometric authentication device 10 transmits the signature information to the server ((13), S115). The server decrypts the signature information with the public key and verifies the signature to confirm that the user is a legitimate user ((14), S116). The continuation state is thus continued. Since continuation acceptance is decided by a method different from the method employed in the initial authentication acceptance-or-nonacceptance decision, the legitimacy verification unit 24 of the biometric authentication device 10 decides that the biometric information presented in step S112 is legitimate. The biometric information's being legitimate means that the biometric information has been obtained from a legitimate user by a legitimate method. Then, the processing is returned to step S109.

If continuation nonacceptance is decided (NG in S113), the continuation processing unit 23 of the biometric authentication device 10 ends the processing. When continuation nonacceptance is decided (NG in step S113), the continuation processing unit 23 may restore the processing to step S103 and the initial authentication acceptance-or-nonacceptance decision may be made again.

Expediently, the above processing of steps S109 to S116 will be called second and subsequent continuation acceptance-or-nonacceptance decisions. However, in the second and subsequent authentication acceptance-or-nonacceptance decisions, decision with the same contents may be made a plurality of number of times to decide continuation acceptance or nonacceptance.

Processing in step S113 will be described. In step S113, continuation acceptance or nonacceptance is decided by a method different from the method employed in the initial authentication acceptance-or-nonacceptance decision made by the authentication processing unit 22. Since the continuation acceptance is decided, the legitimacy verification unit 24 decides that the biometric information presented in step S112 is legitimate. In particular, the legitimacy verification unit 24 decides that the biometric information is legitimate on a basis of results of repeated continuation acceptance-or-nonacceptance decisions.

Therefore, in step S113, a method is employed that can decide continuation acceptance or nonacceptance and, when continuation acceptance is decided, can decide that the biometric information is legitimate. In Embodiment 1, four methods of Method 1 to Method 4 will be described. In step S113, any one of the four methods may be employed. Alternatively, two or more of the four methods may be employed by combination.

<Method 1: Change of Feature to be Used>

The continuation processing unit 23 changes contents or number of features to be used.

Figure 7:
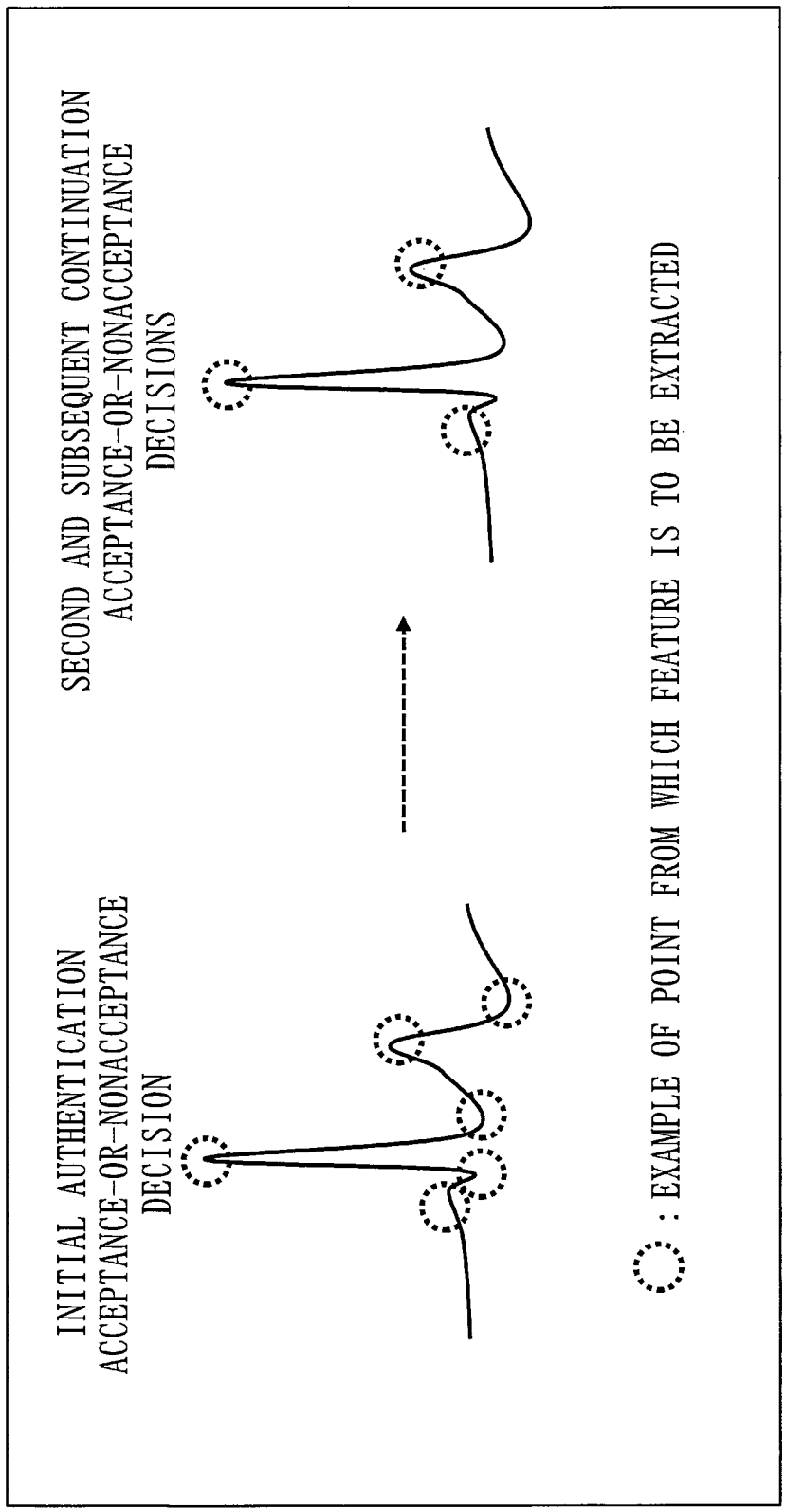
FIG. 7 is an explanatory diagram of Method 1 according to Embodiment 1.

Assume that a feature is to be extracted from a biometric signal covering 1 cycle, as illustrated in FIG. 7. After initial authentication is performed, the biometric signal of the user changes. In continuation acceptance-or-nonacceptance decision, even if the feature is decreased, it is possible to decide that the user is the same user. Hence, it may be possible to use a large feature in the initial authentication acceptance-or-nonacceptance decision, and to use a smaller feature in the second and subsequent continuation acceptance-or-nonacceptance decisions.

A specific explanation will be made with referring to FIGS. 8 and 9.

General authentication acceptance-or-nonacceptance decision processing will be explained with referring to FIG. 8.

Registration processing is executed in advance. In the registration processing, a feature is extracted from biometric information measured with the sensor. The extracted feature is then set as a template. In the authentication acceptance-or-nonacceptance decision, the feature is extracted from the biometric information measured with the sensor. Here, the feature is extracted by the same method as that employed in the registration processing. The extracted feature is compared with the template. Authentication acceptance or nonacceptance is decided in accordance with whether a difference between the feature and the template is equal to or smaller than a tolerance.

Processing of Method 1 will be described with referring to FIG. 9.

Figure 8:
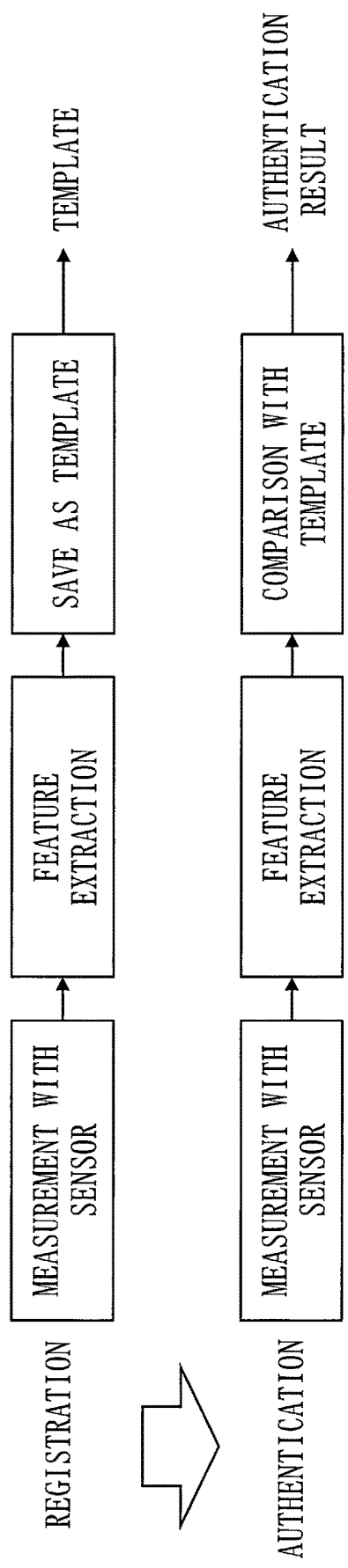
FIG. 8 is an explanatory diagram of general authentication acceptance-or-nonacceptance decision processing.
Figure 9:
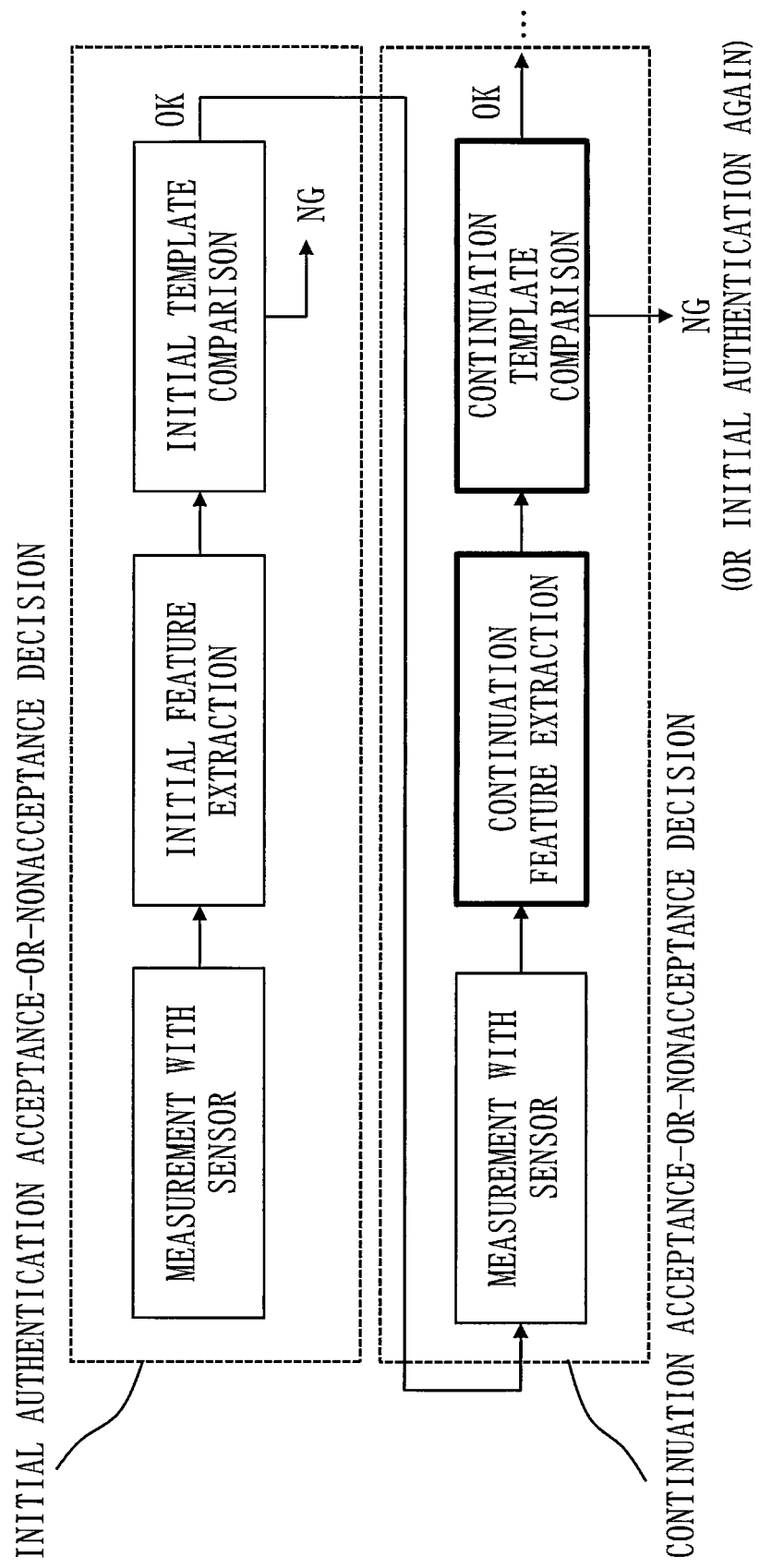
FIG. 9 is an explanatory diagram of processing of Method 1 according to Embodiment 1.

In FIG. 9, processes that are characteristic when compared with the authentication acceptance-or-nonacceptance decision illustrated in FIG. 8 are indicated in thick frames.

Template setting is omitted in FIG. 9. In the processing of Method 1, an initial template and a continuation template are set in advance. The initial template includes a feature extracted by the same method as that employed for the initial feature. The continuation template includes a feature extracted by the same method as that employed for the continuation feature.

In step S105 of FIG. 6, the authentication processing unit 22 generates authentication information by extracting the initial feature from first biometric information acquired by the sensor 17. The authentication processing unit 22 then compares the authentication information with the initial template being set in advance. The authentication processing unit 22 decides authentication acceptance or nonacceptance in accordance with whether a difference between the authentication information and the template is equal to or smaller than a tolerance.

Meanwhile, in step S113 of FIG. 6, the continuation processing unit 23 generates continuation information by extracting a continuation feature from second biometric information acquired by the sensor 17. The continuation feature is different from the initial feature in contents or in number. As described above, the continuation feature may be smaller than the initial feature. Then, the continuation processing unit 23 compares the continuation information with the continuation template being set in advance. The continuation processing unit 23 decides continuation acceptance or nonacceptance in accordance with whether a difference between the continuation information and the template is equal to or smaller than a tolerance.

In this case, the initial feature and the continuation feature are different in contents or in number. However, the continuation feature may be changed in contents or in number in accordance with the number of times of continuation acceptance-or-nonacceptance decision.

<Method 2: Change of Duration of Biometric Information>

The continuation processing unit 23 changes a duration of biometric information to be used. The duration is a number of cycles if the biometric information is a cyclical biometric signal. The cyclical biometric signal is a similar-waveform signal repeated according to a human physiological phenomenon such as heart beat and respiration. The duration can be a fixed time period such as 10 seconds.

Figure 10:
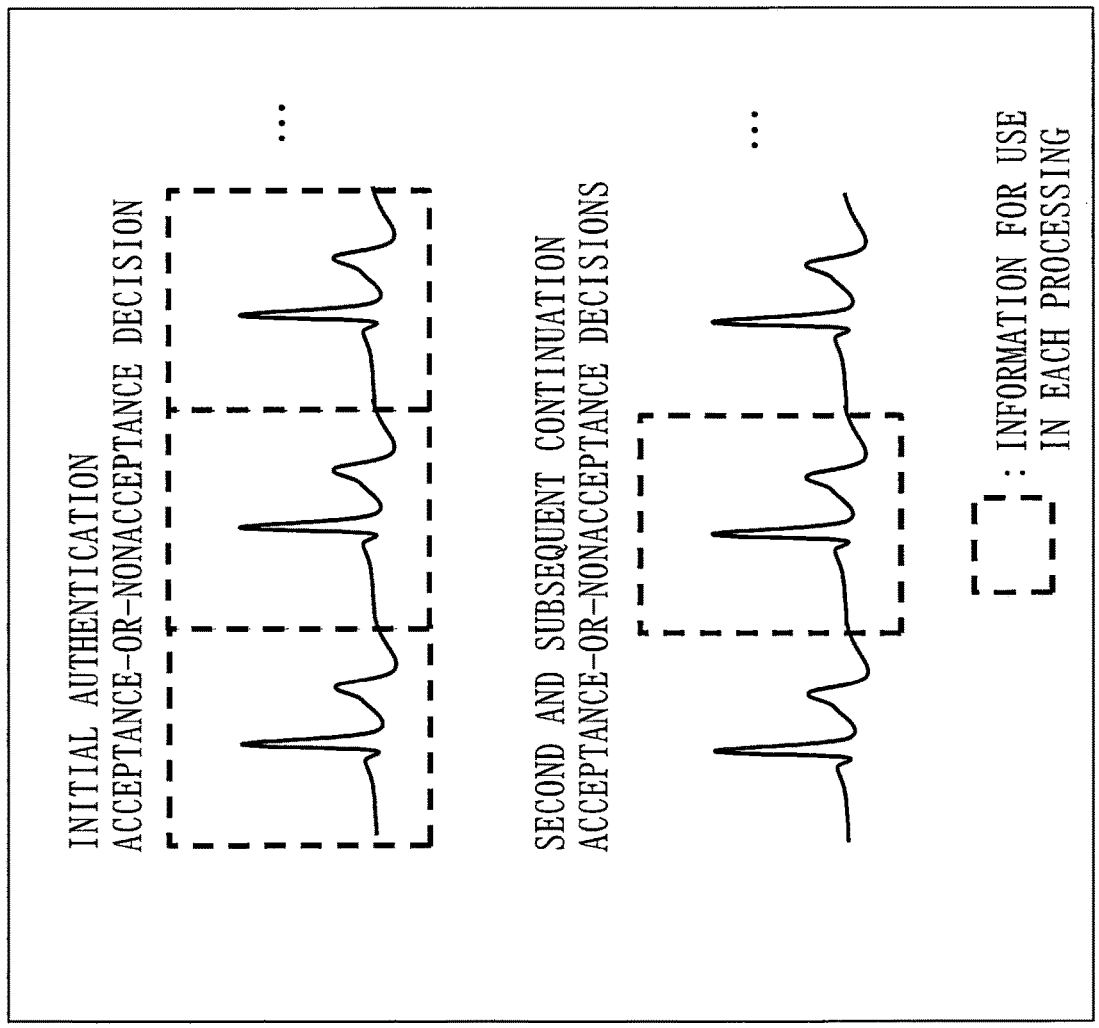
FIG. 10 is an explanatory diagram of Method 2 according to Embodiment 1.

In continuation acceptance-or-nonacceptance decision, even if the amount of biometric information is decreased, it is possible to decide that the user is the same user. Hence, as illustrated in FIG. 10, it may be possible to use biometric information or a feature covering a plurality of cycles in the initial authentication acceptance-or-nonacceptance decision, and to use biometric information or a feature covering 1 cycle in the second and subsequent continuation acceptance-or-nonacceptance decisions. In FIG. 10, biometric information or a feature covering 3 cycles is used in the initial authentication acceptance-or-nonacceptance decision.

In the above explanation, biometric information or a feature covering 1 cycle is used in the second and subsequent continuation acceptance-or-nonacceptance decisions. However, in the second and subsequent continuation acceptance-or-nonacceptance decisions, it suffices as far as biometric information or a feature may be used that covers cycles different in number from the cycles used in the initial authentication acceptance-or-nonacceptance decision. Therefore, in the second and subsequent continuation acceptance-or-nonacceptance decisions, biometric information or a feature covering 2 or more cycles may be used.

Processing of Method 2 will be described with referring to FIG. 11.

Figure 11:
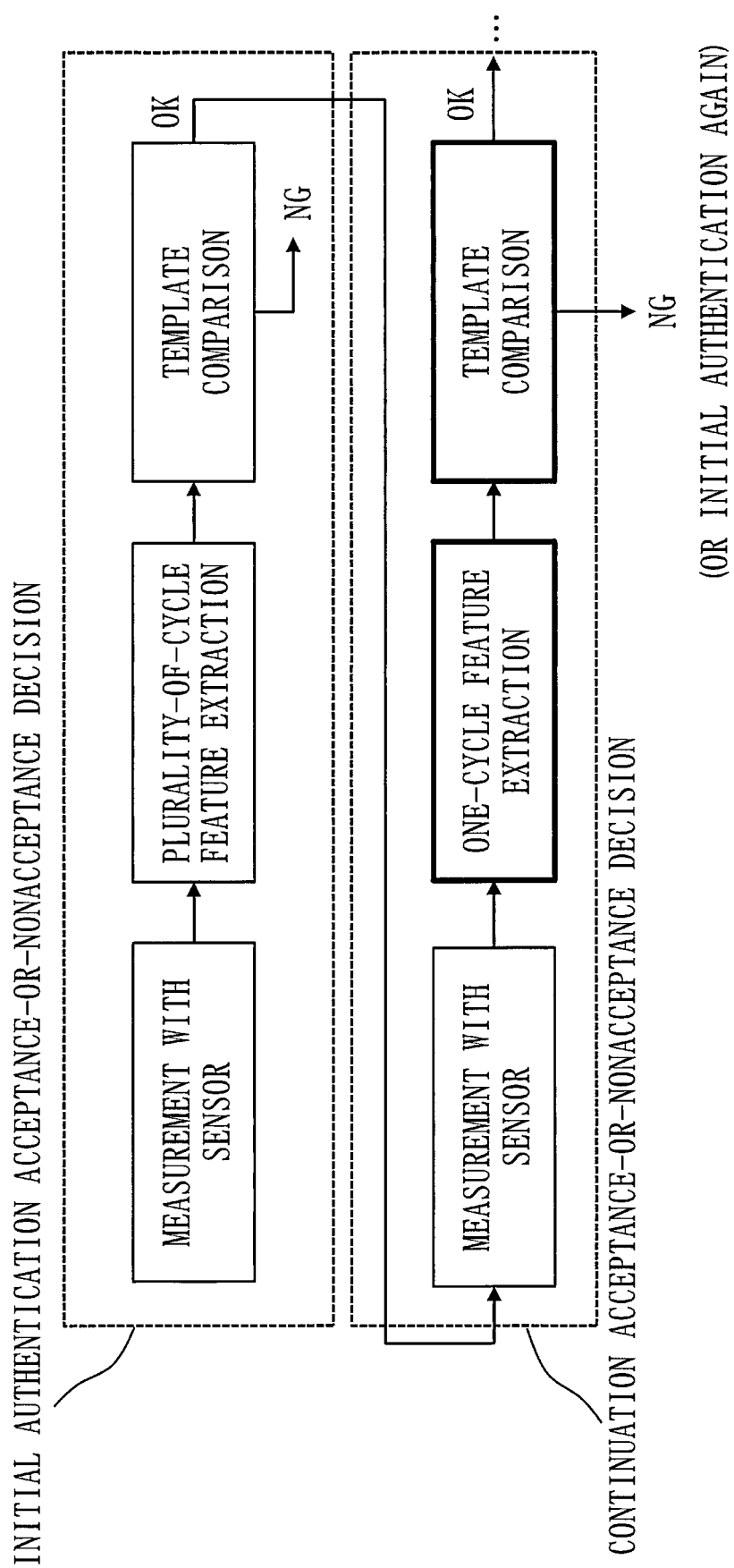
FIG. 11 is an explanatory diagram of processing of Method 2 according to Embodiment 1.

In FIG. 11, processes that are characteristic when compared with the authentication acceptance-or-nonacceptance decision illustrated in FIG. 8 are indicated in thick frames.

Template setting is omitted in FIG. 11. In the processing of Method 2, an initial template and a continuation template are set in advance. The initial template includes a feature covering a plurality of cycles. The continuation template includes a feature covering 1 cycle.

In step S105 of FIG. 6, the authentication processing unit 22 generates authentication information by extracting a feature from first biometric information being biometric information covering a first period (in this case, a plurality of cycles), which is acquired by the sensor 17. Note that the authentication processing unit 22 may use the first biometric information with no change as the authentication information. The authentication processing unit 22 then compares the authentication information with the initial template being set in advance. The authentication processing unit 22 decides authentication acceptance or nonacceptance in accordance with whether a difference between the authentication information and the template is equal to or smaller than a tolerance.

Meanwhile, in step S113 of FIG. 6, the continuation processing unit 23 generates continuation information by extracting a feature from second biometric information covering the second period (in this case, 1 cycle), which is acquired by the sensor 17. Note that the continuation processing unit 23 may use the second biometric information with no change as the continuation information. Then, the continuation processing unit 23 compares the continuation information with the continuation template being set in advance. The continuation processing unit 23 decides continuation acceptance or nonacceptance in accordance with whether a difference between the continuation information and the template is equal to or smaller than a tolerance.

In this case, biometric information or a feature covering 1 cycle is used in the continuation acceptance-or-nonacceptance decision. However, the period of the biometric information to be used may be changed in accordance with the number of times of continuation acceptance-or-nonacceptance decision.

<Method 3: Comparison with Last-Time Information>

Figure 12:
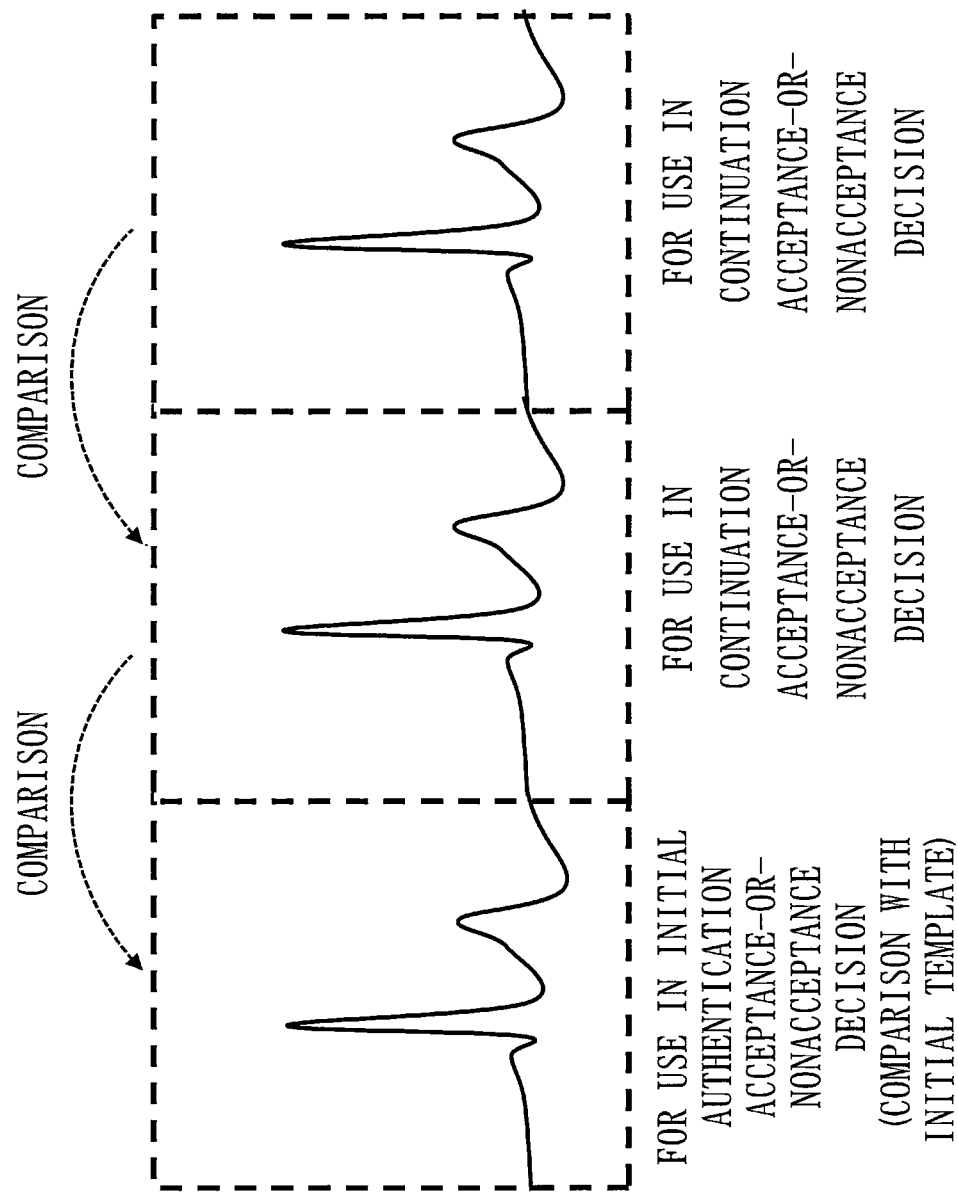
FIG. 12 is an explanatory diagram of Method 3 according to Embodiment 1.

As illustrated in FIG. 12, the continuation processing unit 23 decides continuation acceptance or nonacceptance by comparing newly obtained information with information used in the last-time decision. That is, the continuation processing unit 23 updates the template with authentication information or continuation information each time authentication acceptance or nonacceptance is decided. Hence, continuation acceptance or nonacceptance is decided by comparison with the last-time authentication information or continuation information.

Processing of Method 3 will be described with referring to FIG. 13.

Figure 13:
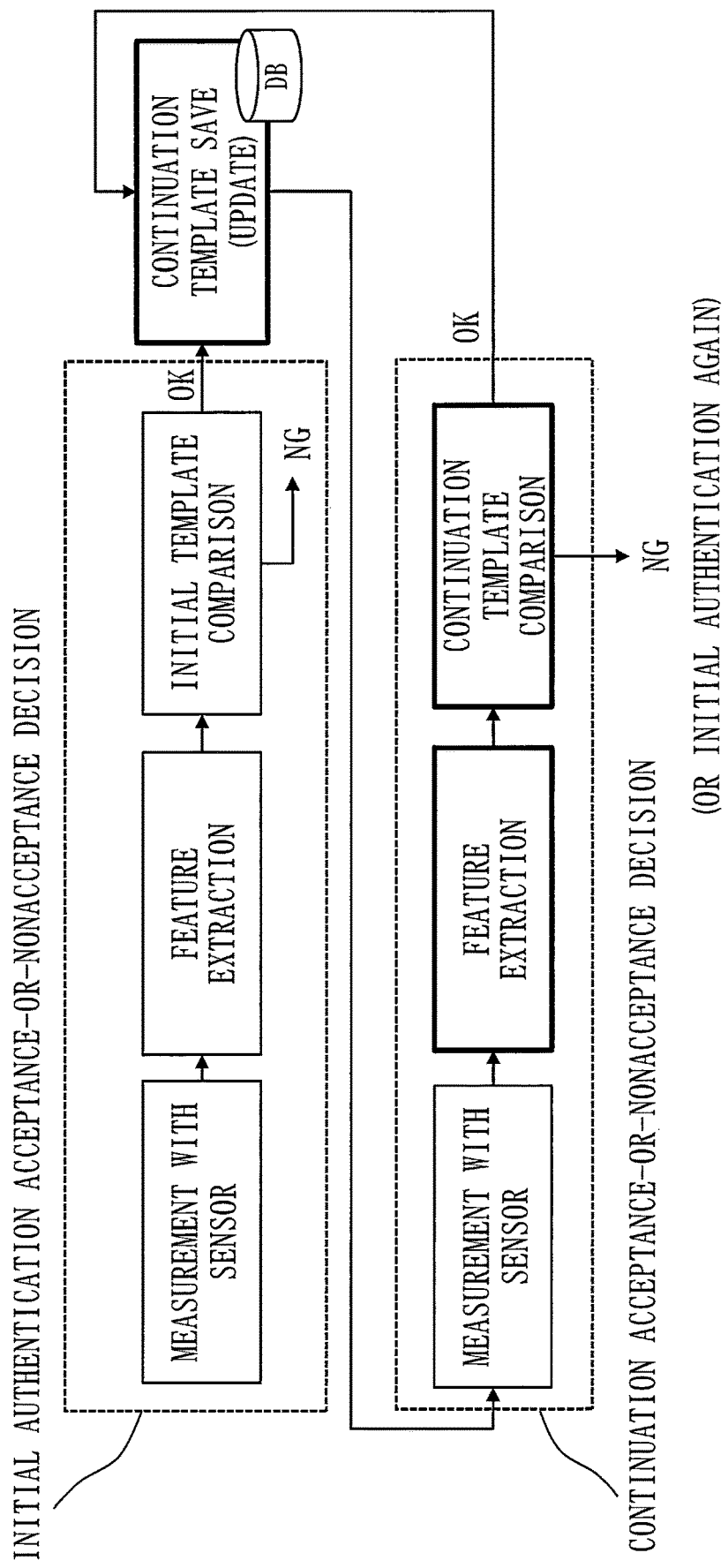
FIG. 13 is an explanatory diagram of processing of Method 3 according to Embodiment 1.

In FIG. 13, processes that are characteristic when compared with the authentication acceptance-or-nonacceptance decision illustrated in FIG. 8 are indicated in thick frames.

In step S105 of FIG. 6, the authentication processing unit 22 generates authentication information by extracting a feature from the first biometric information being biometric information which is acquired by the sensor 17. Note that the authentication processing unit 22 may use the first biometric information with no change as the authentication information. The authentication processing unit 22 then compares the authentication information with the initial template being set in advance. The authentication processing unit 22 decides authentication acceptance or nonacceptance in accordance with whether a difference between the authentication information and the template is equal to or smaller than a tolerance. If authentication acceptance is decided, the authentication processing unit 22 sets the authentication information as a continuation template (second template).

In step S113 of FIG. 6, the continuation processing unit 23 generates continuation information by extracting a feature from second biometric information being biometric information which is acquired by the sensor 17. Note that the continuation processing unit 23 may use the second biometric information with no change as the continuation information. Then, the continuation processing unit 23 compares the continuation information with the continuation template. The continuation processing unit 23 decides continuation acceptance or nonacceptance in accordance with whether a difference between the continuation information and the template is equal to or smaller than a tolerance. If continuation acceptance is decided, the continuation processing unit 23 sets the continuation information as a continuation template. That is, the continuation processing unit 23 updates the continuation template with the continuation information.

Examples of information to be used for comparison of biometric information include indices such as errors between a plurality of biometric signals, a coefficient of correlation, an Euclidean Distance, Dynamic Time Warping, and a Cosine Similarity.

For example, in the initial authentication acceptance-or-nonacceptance decision, the authentication processing unit 22 compares a waveform covering 1 cycle with a template. After that, the authentication processing unit 22 sets the 1-cycle waveform as a continuation template. When making a continuation acceptance-or-nonacceptance decision, the continuation processing unit 23 calculates a difference between the continuation template (of a first cycle) and a waveform of a second cycle. If the difference is equal to or smaller than a tolerance, the continuation processing unit 23 decides continuation acceptance.

However, with the method described above, if an attack described in Non-Patent Literature 1 is made after the initial authentication acceptance or nonacceptance is decided, this attack cannot be coped with. The attack described in Non-Patent Literature 1 is an attack in which an attacker gives stimulation to the body of the user little by little to gradually alter biometric information. Hence, there is a possibility that the legitimacy of the biometric information cannot be guaranteed.

Figure 14:
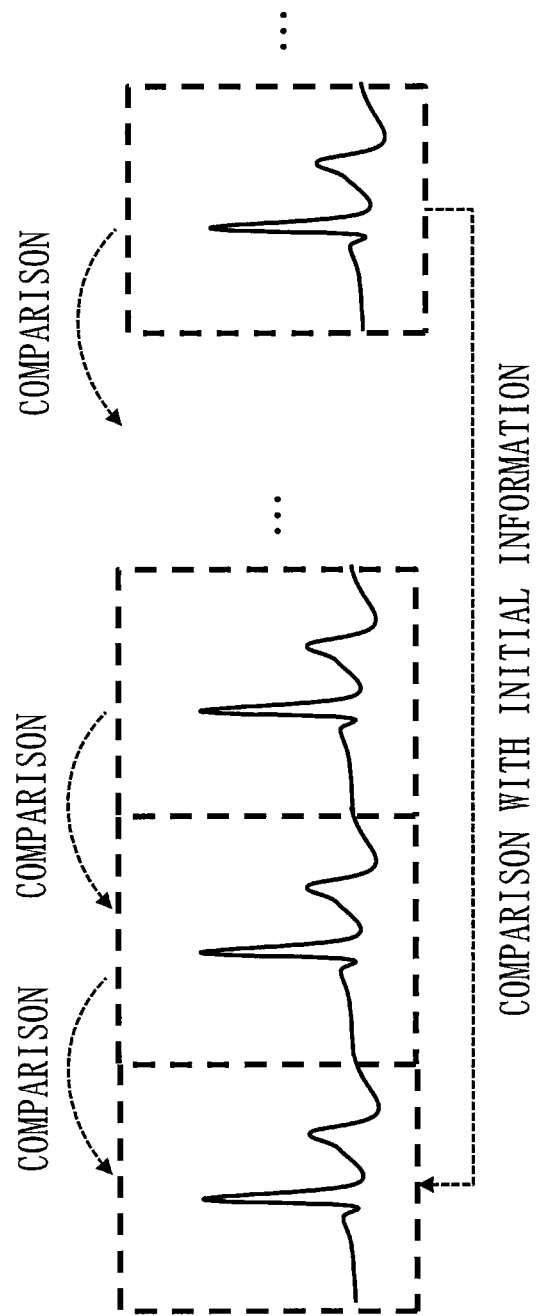
FIG. 14 is an explanatory diagram of an update version of Method 3 according to Embodiment 1.

In view of this, as illustrated in FIG. 14, the continuation processing unit 23 compares information halfway along continuation acceptance-or-nonacceptance decision with initial information. This guarantees the legitimacy of the biometric information halfway along continuation acceptance-or-nonacceptance decision.

Figure 15:
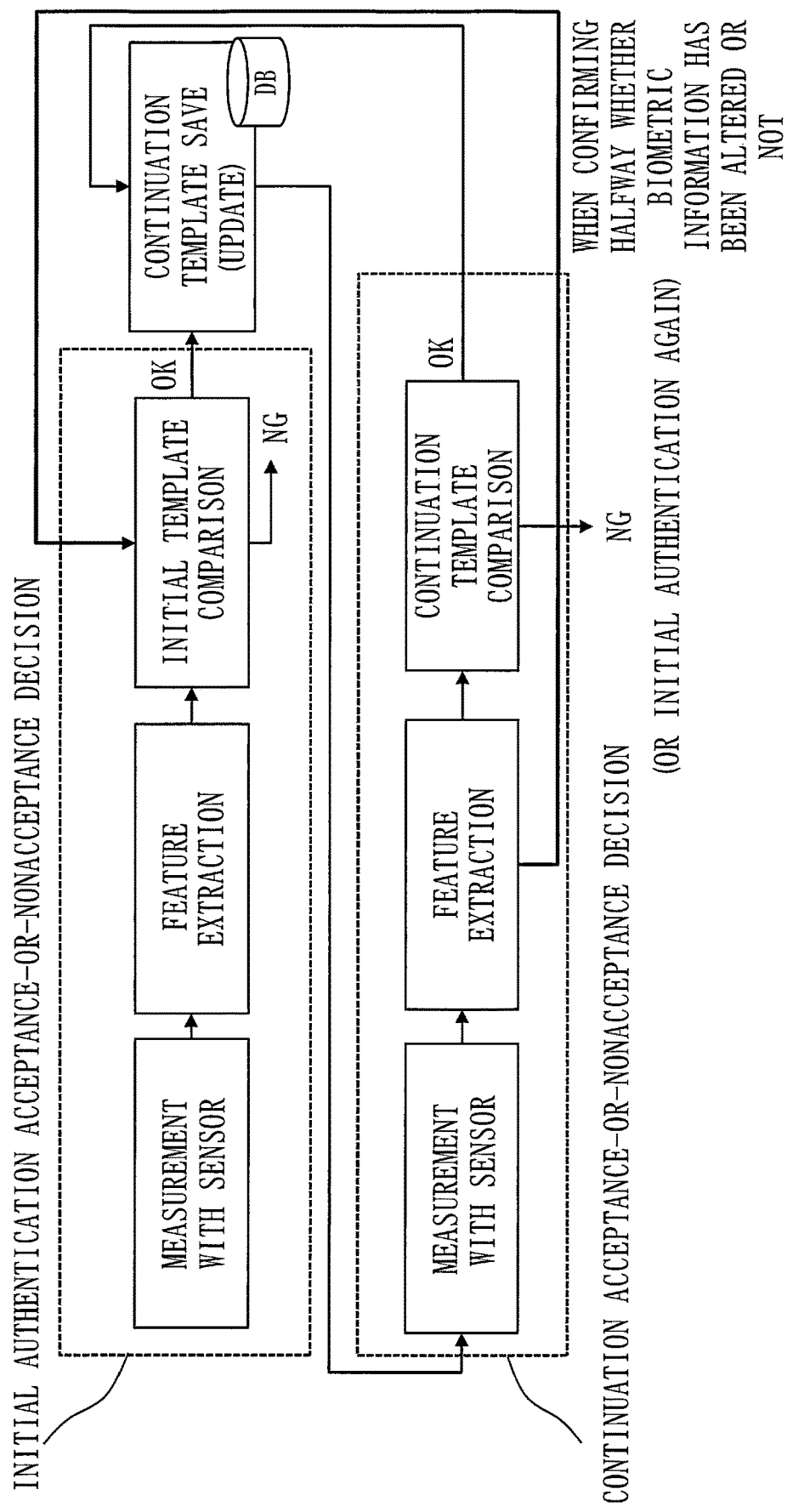
FIG. 15 is an explanatory diagram of processing of the update version of Method 3 according to Embodiment 1.
Figure 16:
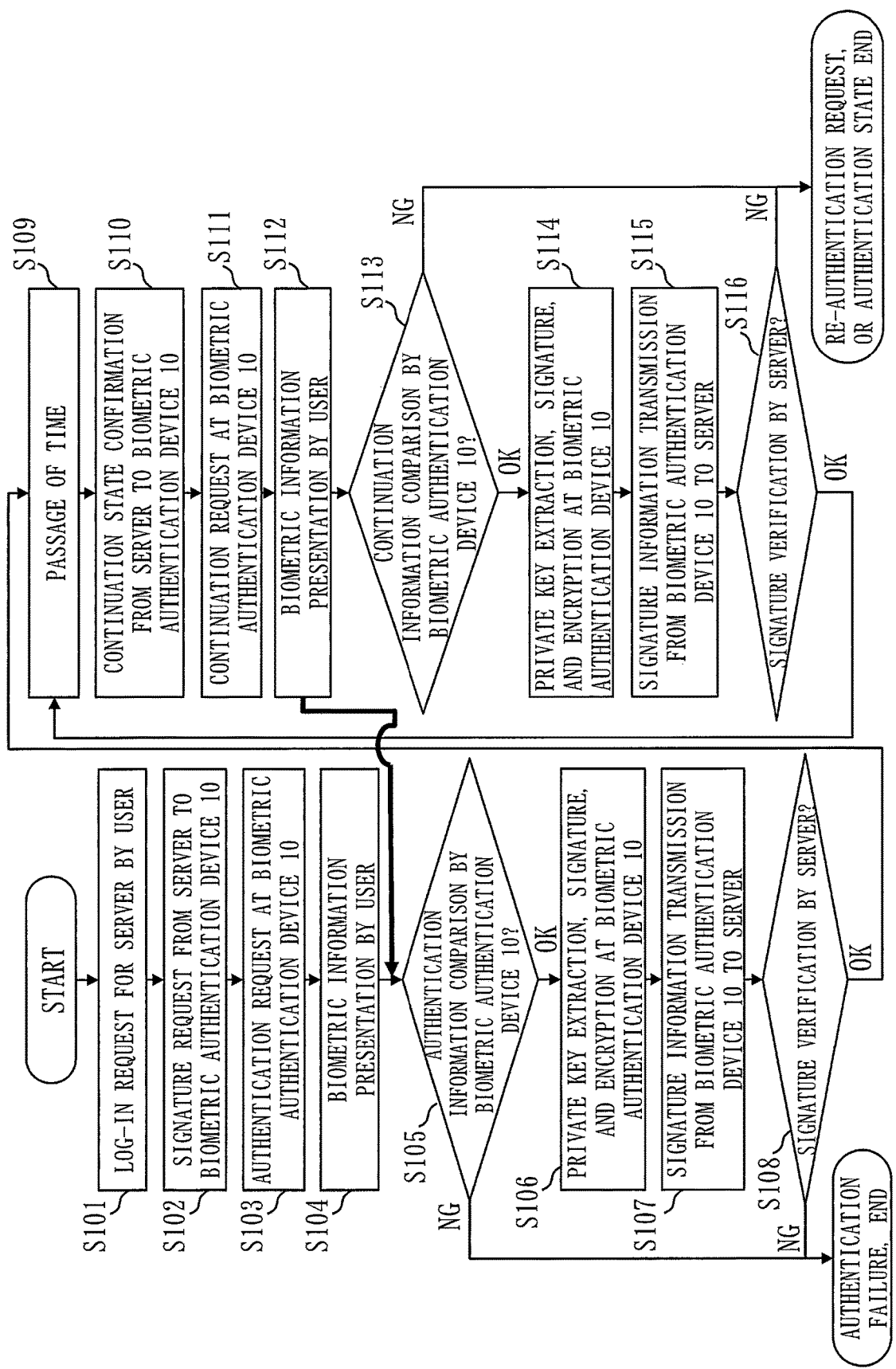
FIG. 16 illustrates a concept of the processing the update version of Method 3 according to Embodiment 1.

An upgrade version of the processing of Method 3 will be described with referring to FIGS. 15 and 16.

Processing in step S105 of FIG. 6 is the same as the processing described with referring to FIG. 13.

In step S113 of FIG. 6, in principle, the same processing as that described with referring to FIG. 13 will be performed. That is, the continuation processing unit 23 compares the continuation information with the continuation template to decide continuation acceptance or nonacceptance. If continuation acceptance is decided, the continuation processing unit 23 sets the continuation information as the continuation template. Note that halfway along continuation acceptance-or-nonacceptance decision, the continuation processing unit 23 compares the continuation information with the initial template instead of the continuation template, and decides continuation acceptance or nonacceptance. That is, as illustrated in FIG. 16, in a way, halfway along continuation acceptance-or-nonacceptance decision, the continuation processing unit 23 restores the processing back to step S105 and makes initial authentication acceptance-or-nonacceptance decision again.

A timing halfway along continuation acceptance-or-nonacceptance decision is a regular timing such as "once a minute", "once every 20 cycles", and so on. The timing halfway along continuation acceptance-or-nonacceptance decision may be a timing that is randomly decided each time. The timing halfway along continuation acceptance-or-nonacceptance decision may be a timing at which a particular feature used for continuation acceptance-or-nonacceptance decision exceeds a certain threshold value.

<Method 4: Utilization of Non-Cyclical Information to Superpose on Biometric Information>

Figure 17:
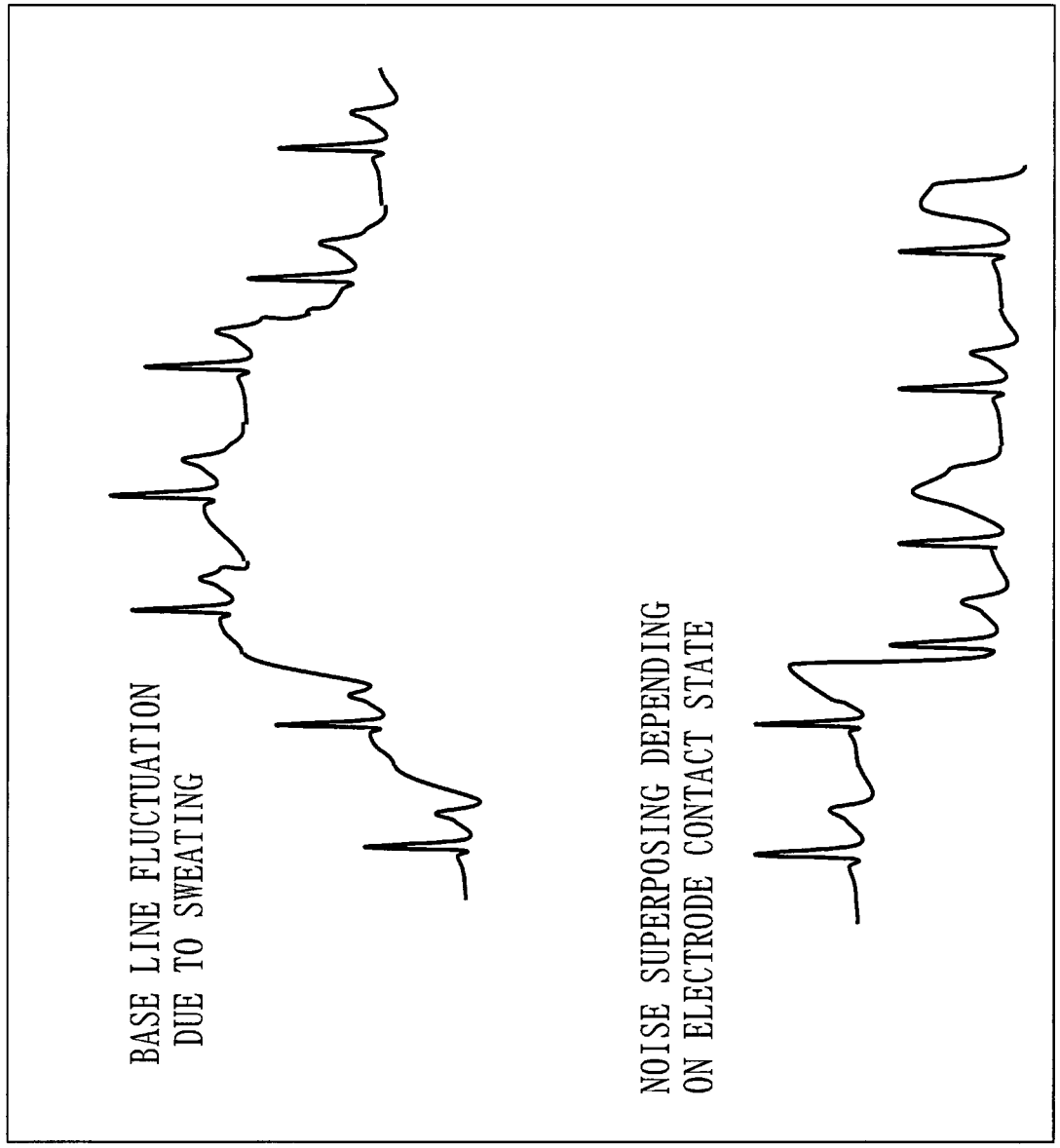
FIG. 17 is an explanatory diagram of non-cyclical information according to Embodiment 1.

The continuation processing unit 23 utilizes non-cyclical information to superpose on the biometric information for continuation acceptance-or-nonacceptance decision. Non-cyclical information resulting from at least either a user of an acquisition source of the biometric information or a device used for acquisition of the biometric information may superpose on cyclical biometric information. FIG. 17 illustrates an example with an electrocardiogram. In an electrocardiogram, the base line may fluctuate moderately due to sweating. Also, irregular deformation can occur depending on a contact state of an electrode. These are non-cyclical information to superpose on the electrocardiogram. Desirably, in authentication acceptance-or-nonacceptance decision and the like, such non-cyclical information is not superposed on the biometric information. Therefore, in many cases, non-cyclical information is removed from the biometric information. However, according to Method 4, non-cyclical information is intentionally extracted and is used for continuation acceptance-or-nonacceptance decision.

Specifically, the continuation processing unit 23 decides continuation acceptance or nonacceptance by comparing newly obtained non-cyclical information with the non-cyclical information used in the last-time decision. That is, the continuation processing unit 23 updates the template with non-cyclical information each time the continuation processing unit 23 decides authentication acceptance or nonacceptance or continuation acceptance or nonacceptance. Hence, continuation acceptance or nonacceptance is decided by comparison with the last-time non-cyclical information.

For example, the following processing may be possible. When making an initial authentication acceptance-or-nonacceptance decision, a base-line value which is non-cyclical information is simultaneously saved as a continuation template. After that, the template is kept updated with a base-line value obtained at the time of continuation acceptance-or-nonacceptance decision. If the base-line value changes largely, the authentication state is canceled.

Processing of Method 4 will be described with referring to FIG. 18.

Figure 18:
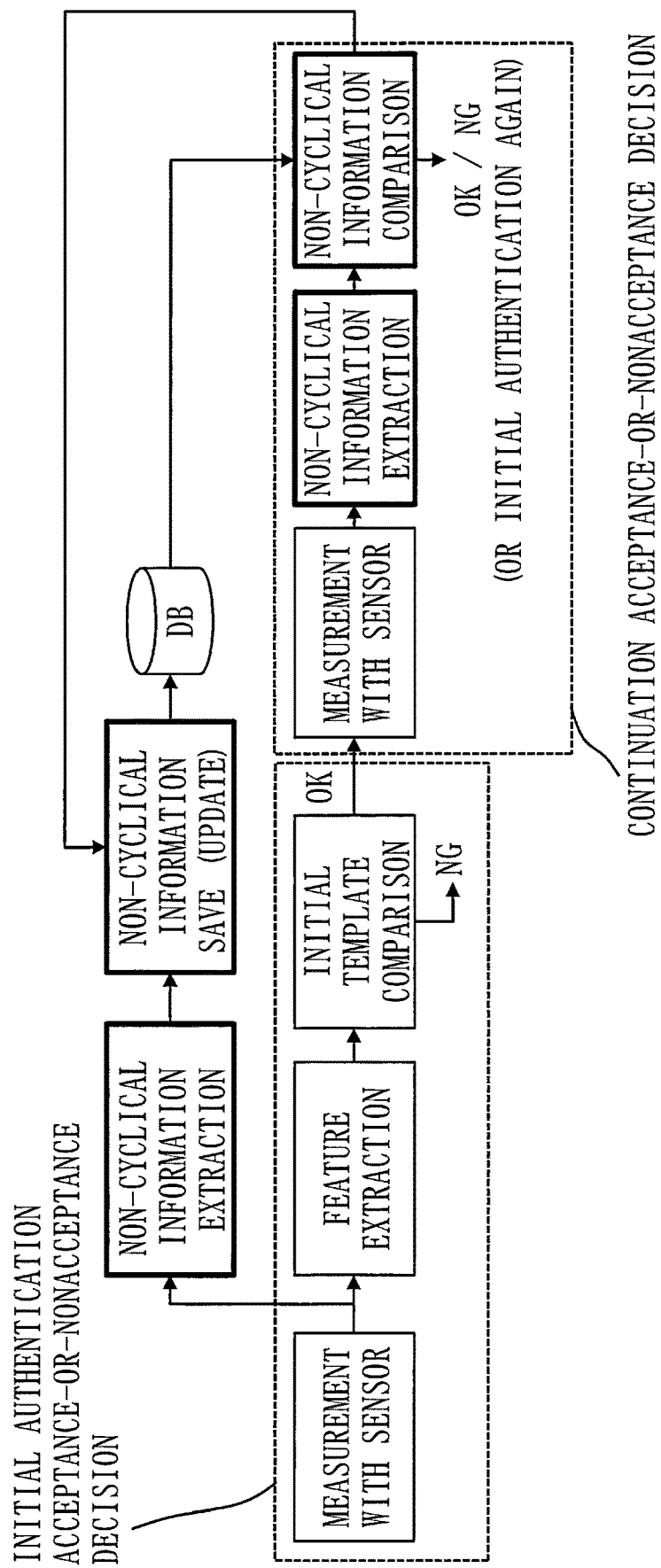
FIG. 18 is an explanatory diagram of processing of Method 4 according to Embodiment 1.

In FIG. 18, processes that are characteristic when compared with the authentication acceptance-or-nonacceptance decision illustrated in FIG. 8 are indicated in thick frames.

In step S105 of FIG. 6, the authentication processing unit 22 generates authentication information by extracting a feature from the first biometric information being biometric information which is acquired by the sensor 17. Note that the authentication processing unit 22 may use the first biometric information with no change as the authentication information. The authentication processing unit 22 then compares the authentication information with the initial template being set in advance. The authentication processing unit 22 decides authentication acceptance or nonacceptance in accordance with whether a difference between the authentication information and the template is equal to or smaller than a tolerance. If authentication acceptance or nonacceptance is decided, the authentication processing unit 22 sets the non-cyclical information superposed on the first biometric information as a continuation template (second template).

In step S113 of FIG. 6, the continuation processing unit 23 extracts non-cyclical information superposed on the second biometric information being biometric information which is acquired by the sensor 17. Then, the continuation processing unit 23 compares the non-cyclical information with the continuation template. The continuation processing unit 23 decides continuation acceptance or nonacceptance in accordance with whether a difference between the non-cyclical information and the template is equal to or smaller than a tolerance. If continuation acceptance is decided, the continuation processing unit 23 sets the non-cyclical information as a continuation template. That is, the continuation processing unit 23 updates the continuation template with the non-cyclical information.

As a non-cyclical information extracting method, a method that performs frequency analysis of the biometric signal may be possible. Note that the non-cyclical information extracting method is not limited to this.

However, with the method described above, if an attack described in Non-Patent Literature 1 is made after the initial authentication acceptance or nonacceptance is decided, this attack cannot be coped with, just as with the case of Method 3. Hence, the continuation processing unit 23 compares information halfway along continuation acceptance-or-nonacceptance decision with the initial information. This guarantees the legitimacy of the biometric information halfway along continuation acceptance-or-nonacceptance decision.

Figure 19:
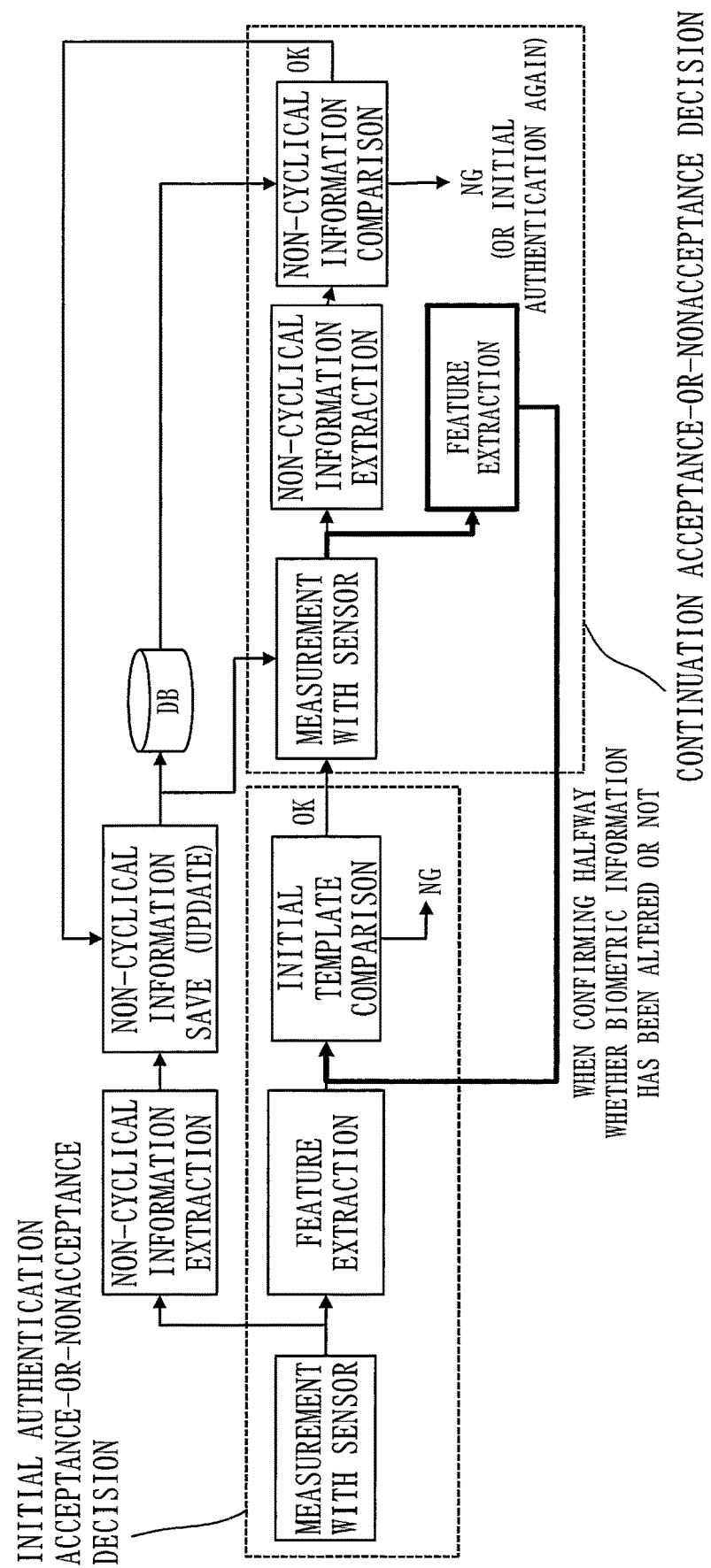
FIG. 19 is an explanatory diagram of processing of an update version of Method 4 according to Embodiment 1.

An upgrade version of the processing of Method 4 will be described with referring to FIG. 19.

Processing in step S105 of FIG. 6 is the same as the processing described with referring to FIG. 18.

In step S113 of FIG. 6, in principle, the same processing as that described with referring to FIG. 18 will be performed. That is, the continuation processing unit 23 compares the non-cyclical information with the continuation template to decide continuation acceptance or nonacceptance. If continuation acceptance is decided, the continuation processing unit 23 sets the non-cyclical information as the continuation template. Note that during continuation acceptance-or-nonacceptance decision, the continuation processing unit 23 extracts a feature instead of non-cyclical information, from the second biometric information. Then, the continuation processing unit 23 compares the extracted feature with the initial template, and decides continuation acceptance or nonacceptance.

A timing halfway along continuation acceptance-or-nonacceptance decision is a regular timing such as "once a minute", "once every 20 cycles", and so on. The timing halfway along continuation acceptance-or-nonacceptance decision may be a timing that is randomly fixed each time. The timing halfway along continuation acceptance-or-nonacceptance decision may be a timing at which a particular feature used for continuation acceptance-or-nonacceptance decision exceeds a certain threshold value.

\*\*\*Effect of Embodiment 1\*\*\*

As described above, the biometric authentication device 10 according to Embodiment 1 decides continuation acceptance or nonacceptance by a method different from a method employed in authentication acceptance-or-nonacceptance decision made by the authentication processing unit 22, with using the second biometric information measured in the authentication state.

Hence, if biometric information used in acceptance-or-nonacceptance decision made by the authentication processing unit 22 is altered by an attacker, it is possible to prevent continuation of the authentication state. As a result, it is possible to decide about continuation acceptance or nonacceptance of the authentication state using the biometric information, and to guarantee legitimacy of the biometric information.

Also, it is possible to decide continuation acceptance or nonacceptance of the authentication state in accordance with a change in user's biometric information that takes place as the time passes or as the user gets exercise. It is also possible to obtain an effect of reducing operations of the authentication processing as necessary.

Presentation of the biometric information, and so on take place between the user and the biometric authentication device 10. However, the biometric authentication device 10 according to Embodiment 1 is based on use of biometric information that can be acquired unconsciously. Therefore, the user is not required to take trouble to present biometric information.

\*\*\*Other Configurations\*\*\*

<Modification 1>

In Embodiment 1, the individual function constituent elements are implemented by software. However, Modification 1 may be possible in which the individual function constituent elements are implemented by hardware. This Modification 1 will be described concerning its difference from Embodiment 1.

When the individual function constituent elements are implemented by hardware, the biometric authentication device 10 is provided with an electronic circuit in place of the processor 11, the memory 12, and the auxiliary storage device 13. The electronic circuit is a dedicated circuit that implements functions of the individual function constituent elements, a function of the memory 12, and a function of the auxiliary storage device 13.

The electronic circuit may be a single circuit, a composite circuit, a programmed processor, a parallel-programmed processor, a logic IC, a GA, an ASIC, and an FPGA. Note that GA stands for Gate Array; ASIC for Application Specific Integrated Circuit; and FPGA for Field-Programmable Gate Array.

The individual function constituent elements may be implemented by one electronic circuit, or may be implemented by a plurality of electronic circuits by distribution.

<Modification 2>

Modification 2 may be possible in which some of the function constituent elements are implemented by hardware and the other individual function constituent elements are implemented by software.

The processor 11, the memory 12, the auxiliary storage device 13, and the electronic circuit are called processing circuitry. That is, the functions of the individual function constituent elements are implemented by processing circuitry.

Embodiment 2

Embodiment 2 is different from Embodiment 1 in that different keys are used when transmitting signature information to the server. In Embodiment 2, this difference will be described, and a description on the same point will be omitted.

\*\*\*Description of Configuration\*\*\*

Figure 20:
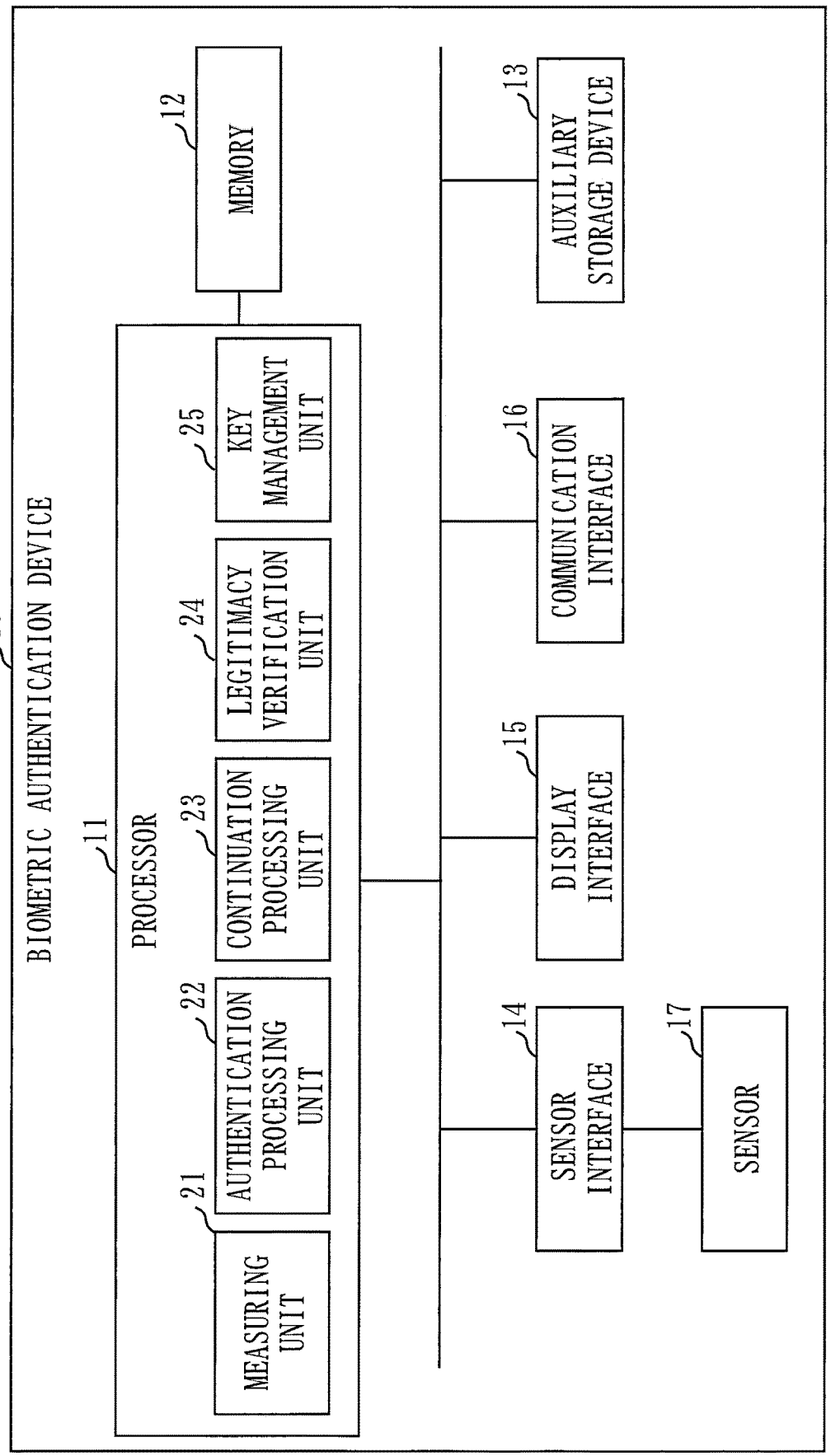
FIG. 20 is a configuration diagram of a biometric authentication device 10 according to Embodiment 2.

A configuration of a biometric authentication device 10 according to Embodiment 2 will be described with referring to FIG. 20.

The biometric authentication device 10 is provided with a key management unit 25 as a function constituent element, and in this respect, is different from the biometric authentication device 10 illustrated in FIG. 1. The key management unit 25 is implemented by software or hardware, just as the other function constituent elements are.

The key management unit 25 manages a plurality of keys corresponding to users. In Embodiment 2, a case will be described where public key cryptography is employed just as in Embodiment 1. Thus, in Embodiment 2, the key management unit 25 manages a plurality of private keys corresponding to the users. The plurality of private keys are stored in a memory 12 or an auxiliary storage device 13. The plurality of private keys may be stored in the memory 12 and the auxiliary storage device 13 by distribution.

\*\*\*Description of Operations\*\*\*

Figure 21:
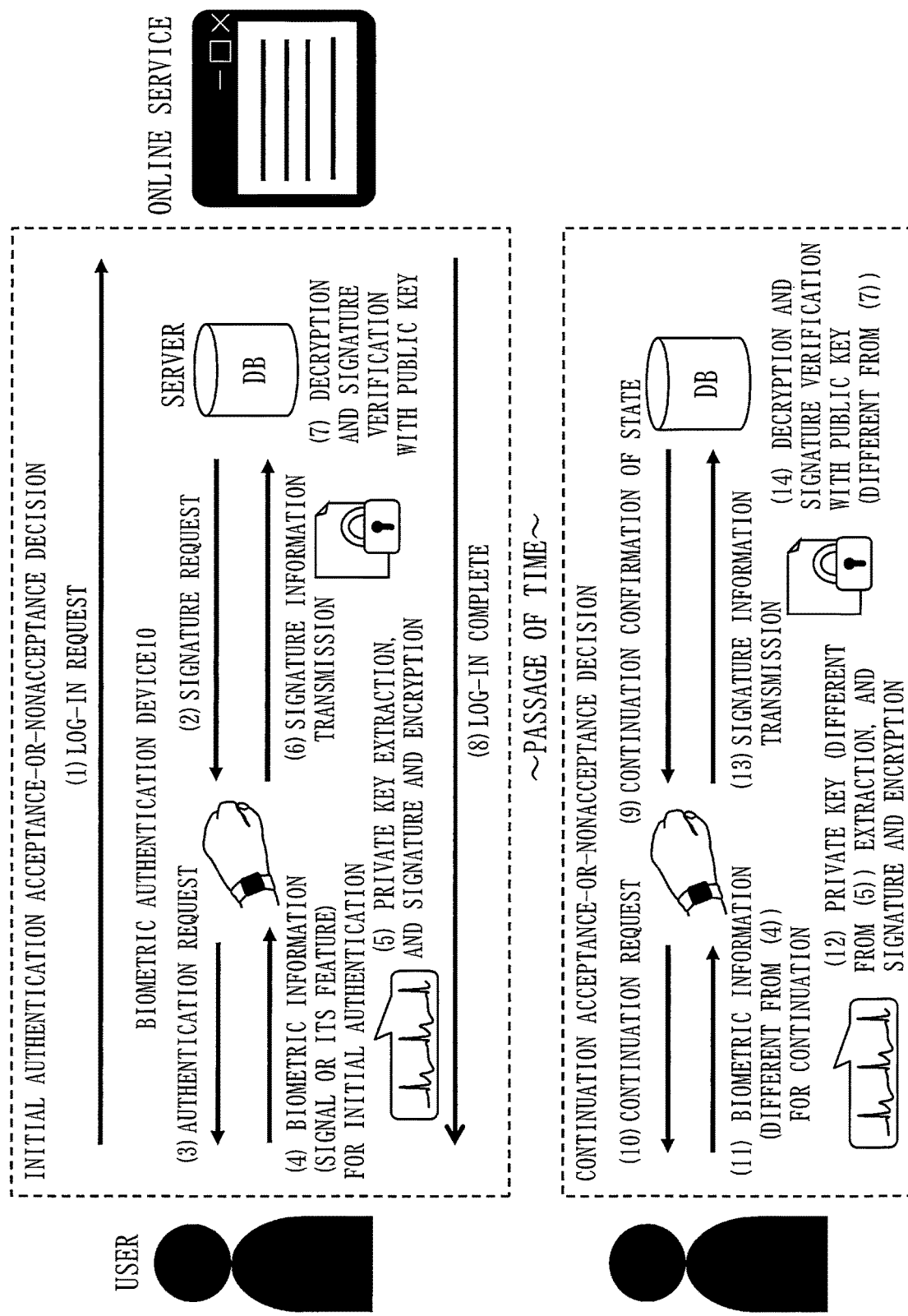
FIG. 21 is an explanatory diagram of processing of the biometric authentication device 10 according to Embodiment 2.

Operations of the biometric authentication device 10 according to Embodiment 2 will be described with referring to FIGS. 21 and 22.

An operation procedure of the biometric authentication device 10 according to Embodiment 2 corresponds to a biometric authentication method according to Embodiment 2. A program that implements the operations of the biometric authentication device 10 according to Embodiment 2 corresponds to a biometric authentication program according to Embodiment 2.

Processing of the biometric authentication device 10 according to Embodiment 2 will be described with referring to FIGS. 21 and 22.

In Embodiment 2, the key management unit 25 manages, as a plurality of keys, a first key (first private key) used when authentication acceptance is decided in authentication acceptance-or-nonacceptance decision, and a second key (second private key) used when continuation acceptance is decided in continuation acceptance-or-nonacceptance decision.

Figure 22:
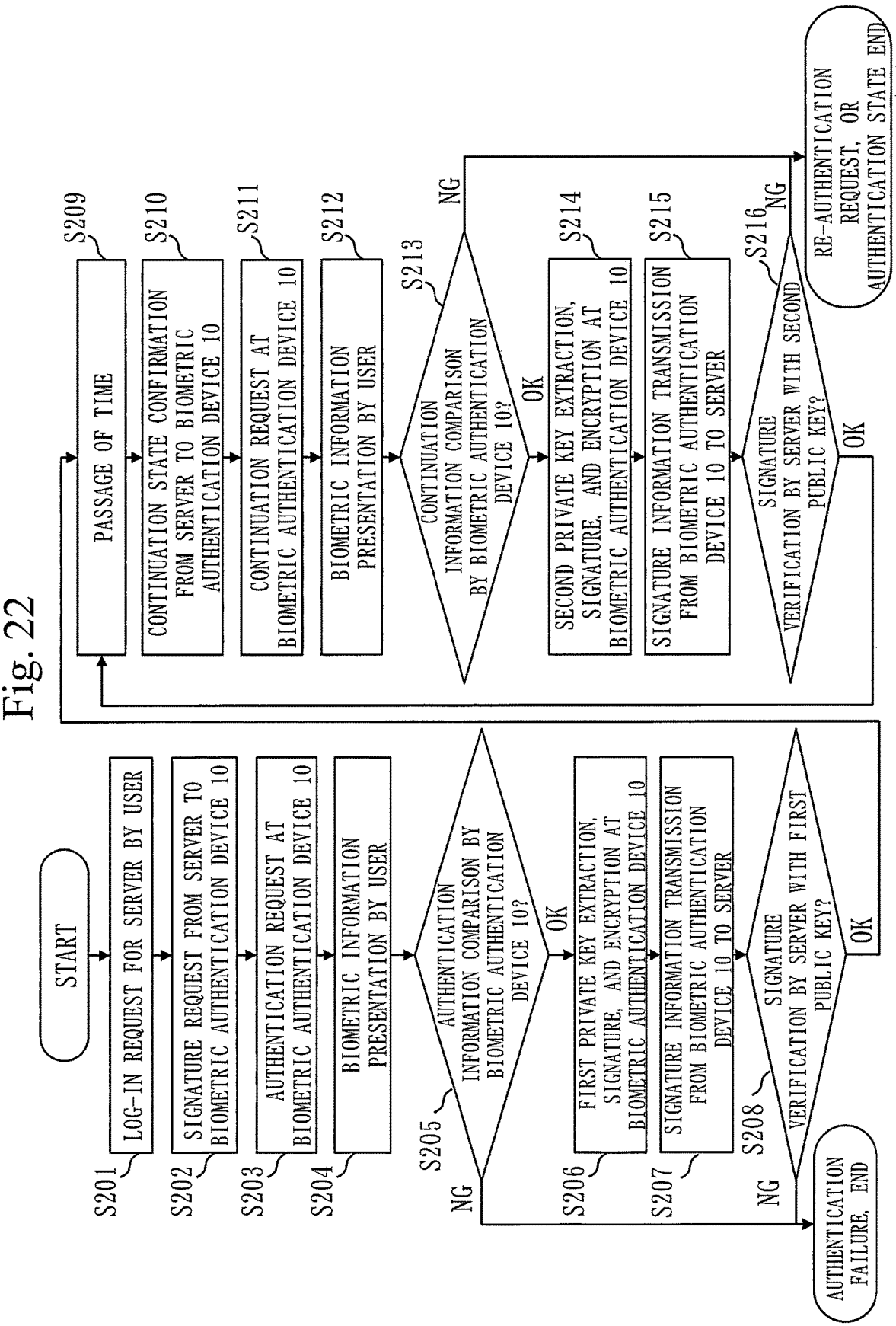
FIG. 22 is a flowchart of the processing of the biometric authentication device 10 according to Embodiment 2.

Processing of step S201 through step S205 of FIG. 22 is the same as the processing of step S101 through step S105 of FIG. 6. Processing of step S207 of FIG. 22 is the same as the processing of step S107 of FIG. 6. Processing of step S209 through step S213 of FIG. 22 is the same as the processing of step S109 through step S113 of FIG. 6. Processing of step S215 of FIG. 22 is the same as the processing of step S115 of FIG. 6.

In step S206, an authentication processing unit 22 extracts the first private key managed by the key management unit 25, and performs signature and encryption with the first private key in response to a signature request, thus generating signature information. In step S208, the server decrypts the signature information with a first public key corresponding to the first private key and verifies the signature to confirm that the user is a legitimate user.

In step S214, a continuation processing unit 23 extracts the second private key managed by the key management unit 25, and performs signature and encryption with the second private key in response to a signature request, thus generating signature information. In step S216, the server decrypts the signature information with a second public key corresponding to the second private key and verifies the signature to confirm that the user is a legitimate user.

In the above description, the key management unit 25 manages, as the plurality of keys, the first key used when authentication acceptance is decided, and the second key used when continuation acceptance is decided. However, management of the keys is not limited to this. The key management unit 25 may manage keys per biometric condition expressing a state of the user. The state of the user may include an exercise state, a health state, and an authority given in the service.

In this case, in a case where authentication acceptance is decided and a case where continuation acceptance is decided, the key management unit 25 specifies from the biometric information a biometric condition that the user satisfies, and specifies a corresponding key. Then, the authentication processing unit 22 and the continuation processing unit 23 generate signature information with using the key specified by the key management unit 25.

\*\*\*Effect of Embodiment 2\*\*\*

As described above, the biometric authentication device 10 according to Embodiment 2 uses different keys when transmitting the signature information to the server. Thus, the server can switch the services or authorities in accordance with the signature information.

For example, assume that information is to be provided to the user in accordance with a health condition such as "good condition" and "bad condition". The information referred to here is, for example, a recommended meal menu. In this case, by using different keys in accordance with the health condition, a service can be provided while protecting the privacy, without transmitting biometric information to the server.

When using biometric authentication device 10 for shopping, assume that control is performed in which after an initial authentication acceptance or nonacceptance is decided, payment is permitted only for a predetermined period of time, and after continuation acceptance or nonacceptance is decided, only checking of a balance of account is permitted. In this case, if different keys are used depending on whether authentication acceptance is decided or continuation acceptance is decided, the server is able to perform control on a basis of signature information. That is, the server side can judge authority switching for the same user on a basis of the signature information.

In Embodiment 1, the same private key is extracted even for the biometric information. This increases a risk of secret key leakage which occurs when, for example, false biometric information is inputted. However, in Embodiment 2, since different keys are used, this risk can be reduced.

Embodiment 3

In Embodiment 3, when a re-authentication condition is satisfied in the authentication state, re-authentication acceptance or nonacceptance is decided. In this respect, Embodiment 3 is different from Embodiments 1 and 2. In Embodiment 3, this difference will be described, and a description on the same point will be omitted. In Embodiment 3, a case where Embodiment 1 is modified will be described.

However, Embodiment 2 can also be modified.

\*\*\*Description of Configuration\*\*\*

Figure 23:
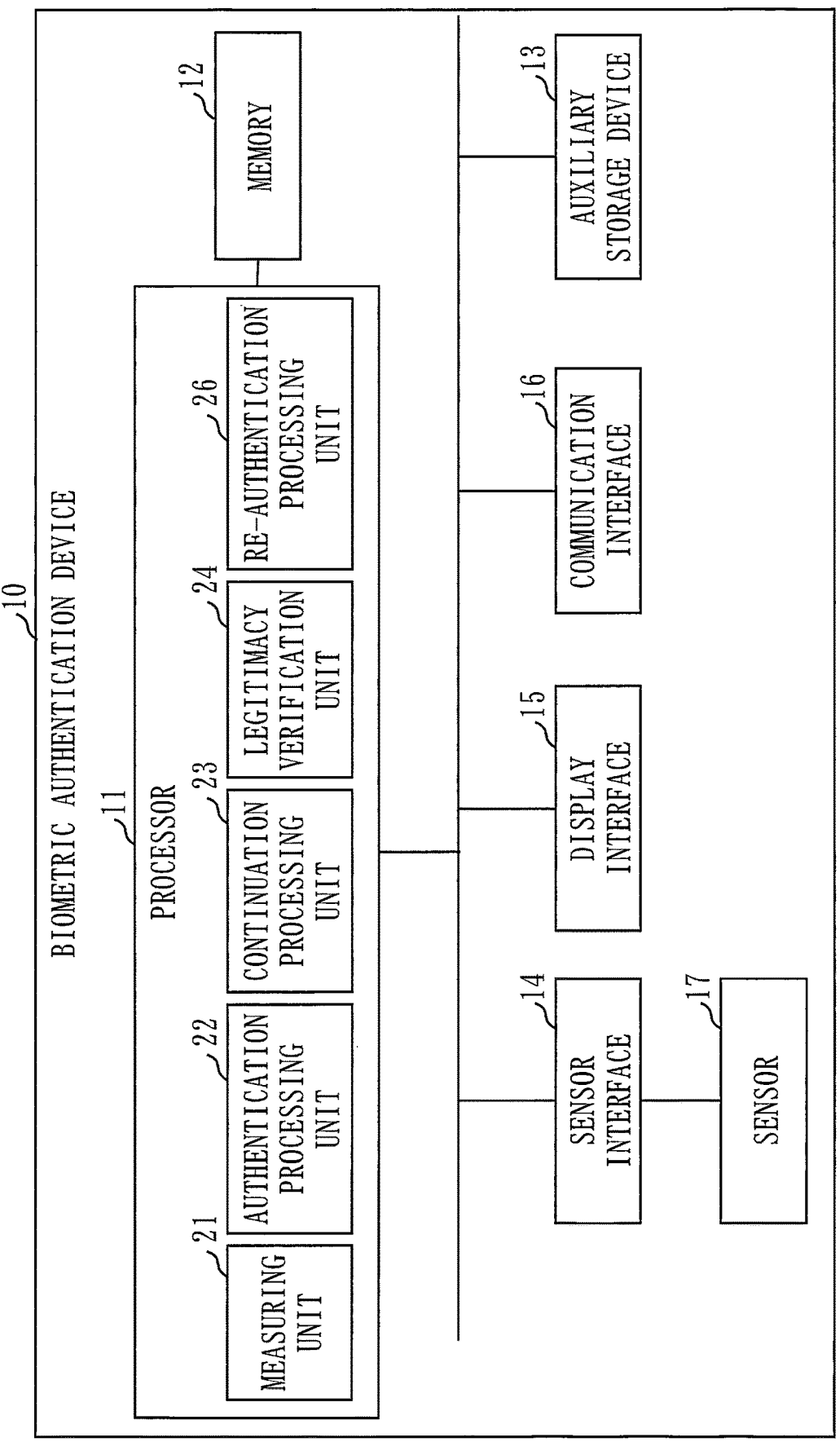
FIG. 23 is a configuration diagram of a biometric authentication device 10 according to Embodiment 3.

A configuration of a biometric authentication device 10 according to Embodiment 3 will be described with referring to FIG. 23.

The biometric authentication device 10 is provided with a re-authentication processing unit 26 as a function constituent element, and in this respect, is different from the biometric authentication device 10 illustrated in FIG. 1. The re-authentication processing unit 26 is implemented by software or hardware, just as the other function constituent elements are.

When the re-authentication condition is satisfied in the authentication state, the re-authentication processing unit 26 decides re-authentication acceptance or nonacceptance. The re-authentication processing unit 26 manages the re-authentication condition. The re-authentication condition is fixed in accordance with the contents of the service requested by the user, and so on. The re-authentication condition is stored in a memory 12 or an auxiliary storage device 13.

\*\*\*Description of Operations\*\*\*

Figure 24:
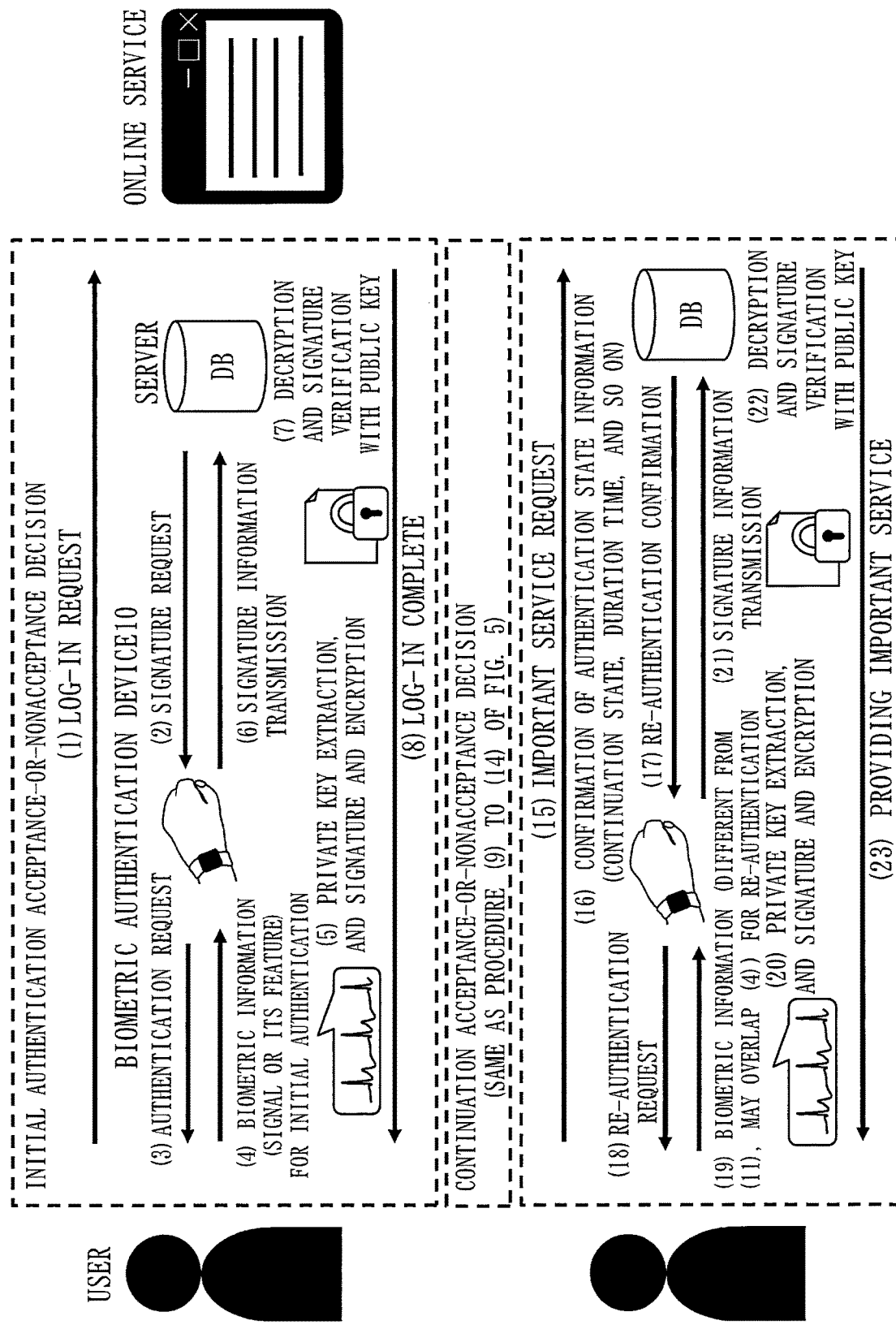
FIG. 24 is an explanatory diagram of processing of the biometric authentication device 10 according to Embodiment 3.

Operations of the biometric authentication device 10 according to Embodiment 3 will be described with referring to FIGS. 24 and 25.

An operation procedure of the biometric authentication device 10 according to Embodiment 3 corresponds to a biometric authentication method according to Embodiment 3. A program that implements the operations of the biometric authentication device 10 according to Embodiment 3 corresponds to a biometric authentication program according to Embodiment 3.

Processing of the biometric authentication device 10 according to Embodiment 3 will be described with referring to FIGS. 24 and 25.

In Embodiment 3, the re-authentication condition is that an important service has been requested by the user. The important service is, for example, payment at a shop using the biometric authentication device 10.

Figure 25:
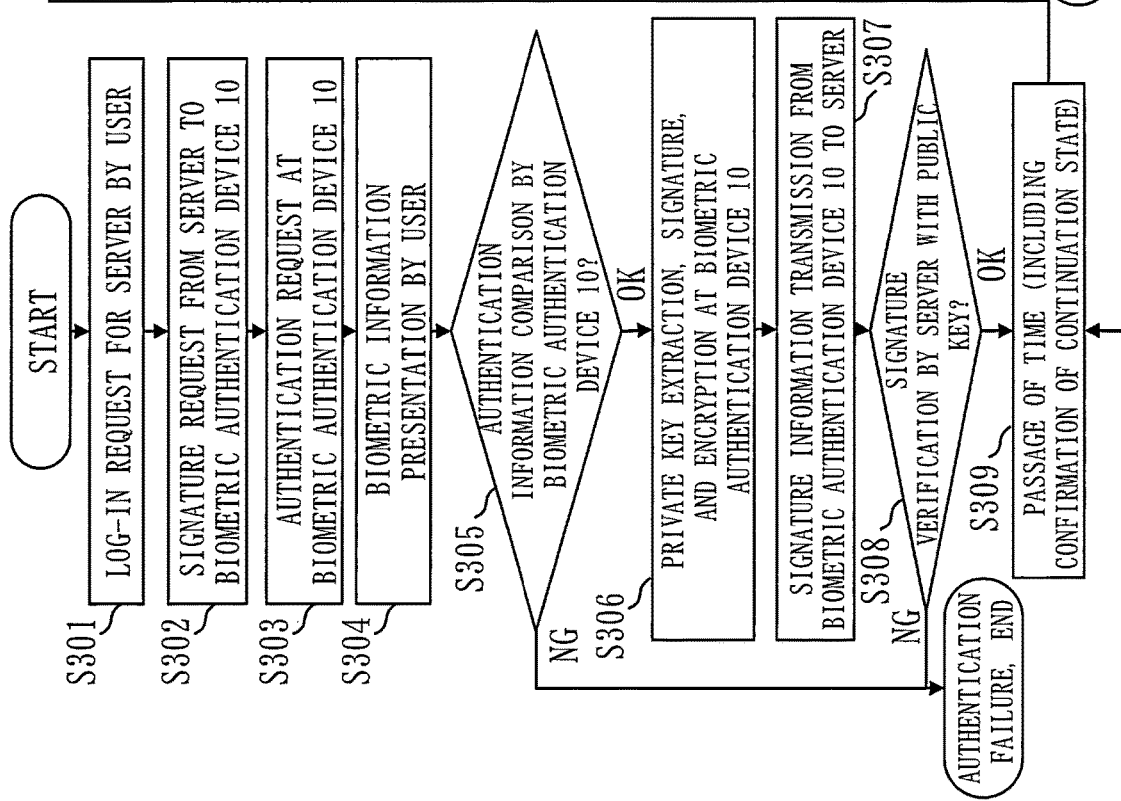
FIG. 25 is a flowchart of the processing of the biometric authentication device 10 according to Embodiment 3.

Processing of step S301 through step S308 of FIG. 25 is the same as the processing of step S101 through step S108 of FIG. 6. Processing of step S309 of FIG. 25 is the same as the processing of step S109 through step S116 of FIG. 6.

The user transmits to the server a request for the important service among on-line services ((15), S310). This satisfies the re-authentication condition.

Continuation acceptance-or-nonacceptance decision is made under a condition where an exercise state and the like after making initial authentication acceptance-or-nonacceptance decision are considered. Accordingly, the decision may be less strict. Thus, it is not desirable to implement services involving money transaction by only a decision about continuation acceptance or nonacceptance. Hence, the server confirms an authentication state of the user ((16), S311). The authentication state expresses whether the user has just passed the initial authentication acceptance-or-nonacceptance decision, whether the user passed continuation acceptance-or-nonacceptance decision, a duration time of the authentication state, and so on. If the authentication state is within a tolerance range (OK in S312) where the important service can be provided, the server provides the important service. If the authentication state is outside the tolerance range (NG in S312) where the important service can be provided, the server transmits a re-authentication request to the biometric authentication device 10 ((17), S313). If the authentication state is far beyond the tolerance range, the server may discontinue the continuation state itself and close the service.

A measuring unit 21 of the biometric authentication device 10 makes the re-authentication request to the user ((18), S314). The user presents biometric information for re-authentication ((19), S315). This means that the measuring unit 21 measures the biometric information of the user with a sensor 17. The biometric information for re-authentication may be the same as the first biometric information in the initial authentication acceptance-or-nonacceptance decision, or may be different from it.

The re-authentication processing unit 26 of the biometric authentication device 10 extracts a feature from third biometric information being the presented biometric information, so as to generate re-authentication information that differs depending on the individual living body. The re-authentication processing unit 26 may generate the re-authentication information by extracting the same feature as the feature extracted by the authentication processing unit 22. The re-authentication processing unit 26 may generate the re-authentication information by extracting a feature different from feature extracted by the authentication processing unit 22. Then, the re-authentication processing unit 26 decides re-authentication acceptance or nonacceptance on a basis of the re-authentication information (S316). Specifically, the re-authentication processing unit 26 compares the re-authentication information with a third template being set in advance to decide whether a difference is equal to or smaller than a tolerance. If the difference is equal to or smaller than the tolerance, the re-authentication processing unit 26 decides re-authentication acceptance. If the difference is larger than the tolerance, the re-authentication processing unit 26 decides re-authentication nonacceptance.

If re-authentication acceptance is decided (OK in S316), the re-authentication processing unit 26 of the biometric authentication device 10 extracts the private key that is held, and performs signature and encryption with the private key in response to the signature request, thus generating signature information ((20), S317). The re-authentication processing unit 26 of the biometric authentication device 10 transmits the signature information to the server ((21), S318). The server decrypts the signature information with the public key and verifies the signature to confirm that the user is a legitimate user ((22), S319). When the user is confirmed to be a legitimate user, the server provides an important service to the user ((23)). After providing the important service, the processing is returned to step S309.

A pair consisting of a private key and a public key which are employed here may be the same pair as those employed after authentication acceptance-or-nonacceptance decision and after continuation acceptance-or-nonacceptance decision.

The pair consisting of the private key and the public key which are employed here may be different from the pair employed after authentication acceptance-or-nonacceptance decision and after continuation acceptance-or-nonacceptance decision, as described in Embodiment 2.

\*\*\*Effect of Embodiment 3\*\*\*

As described above, the biometric authentication device 10 according to Embodiment 3 makes decision about authentication acceptance or nonacceptance when the re-authentication condition is satisfied in the authentication state. This makes it possible to safely provide the important service to the user while the state where the user is authenticated is maintained.

Embodiment 4

In Embodiment 4, the user has a plurality of devices, linking with the other devices is confirmed, and continuation acceptance or nonacceptance is decided. In this respect, Embodiment 4 is different from Embodiments 1 to 3. In Embodiment 4, these differences will be described, and description on the same point will be omitted. In Embodiment 4, a case where Embodiment 1 is modified will be described.

However, it is possible to modify Embodiments 2 and 3.

*Description of Configuration*

Figure 26:
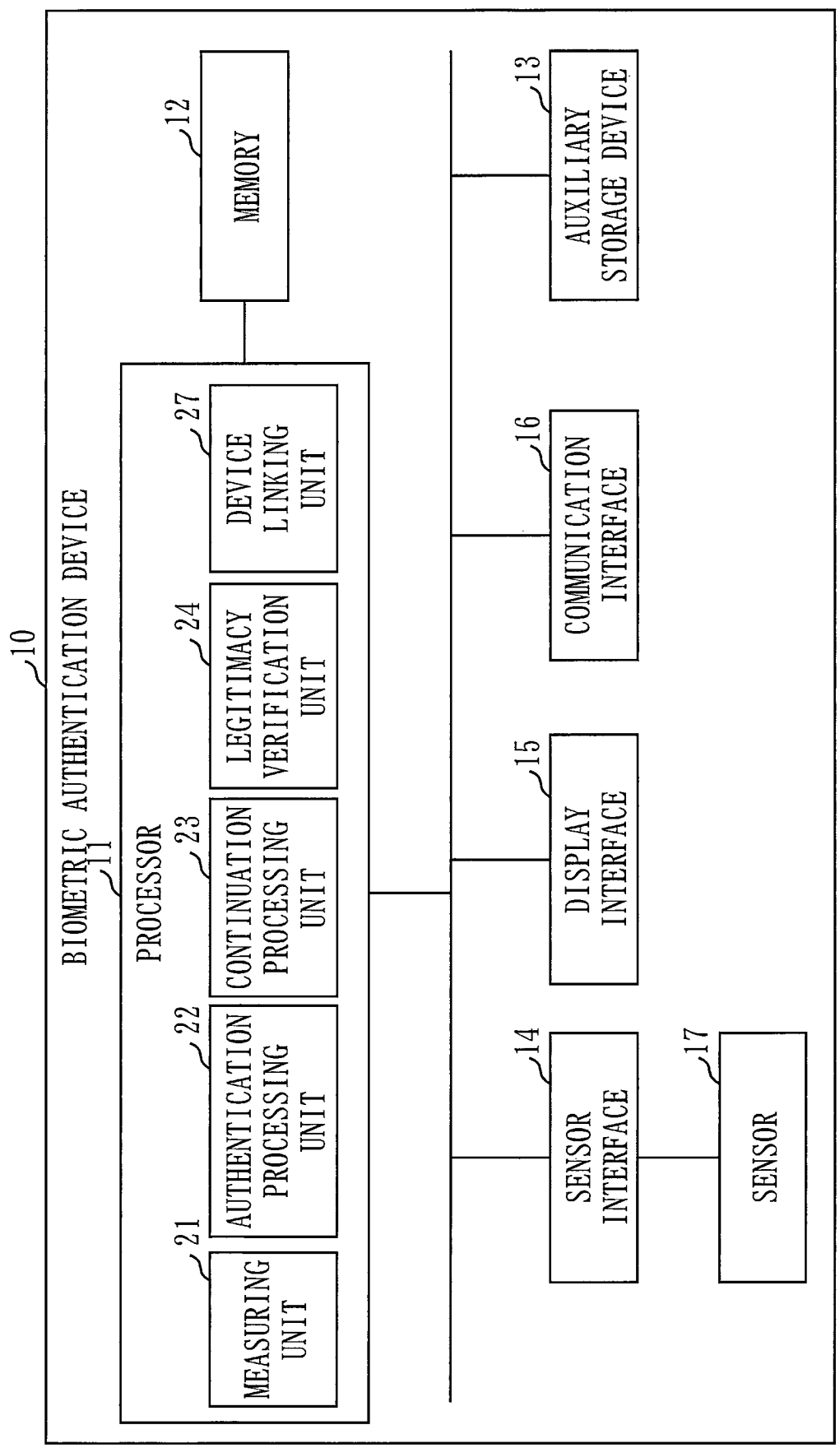
FIG. 26 is a configuration diagram of a biometric authentication device 10 according to Embodiment 4.

A configuration of a biometric authentication device 10 according to Embodiment 4 will be described with referring to FIG. 26.

The biometric authentication device 10 is provided with a device linking unit 27 as a function constituent element, and in this respect, is different from the biometric authentication device 10 illustrated in FIG. 1. The device linking unit 27 is implemented by software or hardware just as the other function constituent elements are.

The device linking unit 27 confirms linking among a plurality of devices.

*Description of Operations*

Operations of the biometric authentication device 10 according to Embodiment 4 will be described with referring to FIGS. 27 and 28.

An operation procedure of the biometric authentication device 10 according to Embodiment 4 corresponds to a biometric authentication method according to Embodiment 4. A program that implements the operations of the biometric authentication device 10 according to Embodiment 4 corresponds to a biometric authentication program according to Embodiment 4.

Processing of the biometric authentication device 10 according to Embodiment 4 will be described with referring to FIGS. 27 and 28.

Assume that in Embodiment 4, the user owns a plurality of devices. The devices owned by the user may be of any types, for example, a wearable device, mobile equipment, and stationary equipment. Assume that in Embodiment 4, one of the plurality of devices is the biometric authentication device 10.

Processing of step S401 through step S410 of FIG. 28 is the same as the processing of step S101 through step S110 of FIG. 6. Processing of step S412 through step S417 of FIG. 28 is the same as the processing of step S111 through step S116 of FIG. 6.

In step S411, the device linking unit 27 of the biometric authentication device 10 confirms linking with another device. Specifically, the device linking unit 27 communicates with another device and confirms that another device is in an appropriate state.

For example, the device linking unit 27 identifies a distance between the biometric authentication device 10 and another device by using a position of another device which is obtained from a position information service. Then, if the distance is smaller than a threshold value, the device linking unit 27 decides that another device is in an appropriate state. The device linking unit 27 may identify a distance between an individual device and the living body (user) which can be acquired with a sensor. If the distance is smaller than the threshold value, the device linking unit 27 may decide that the individual device is in an appropriate state. The device linking unit 27 may decide whether another device is in an appropriate state or not from how another device is mounted or owned. The device linking unit 27 may decide whether the individual device is in an appropriate state or not in accordance with whether the individual device is in an active state or inactive state.

If the individual device is in an appropriate state (OK in S411), the device linking unit 27 forwards the processing to step S412. If the individual device is not in an appropriate state (NG in S411), the device linking unit 27 ends the processing. If continuation nonacceptance is decided (NG in S411), the device linking unit 27 may restore the processing to step S403 so the initial authentication acceptance-or-nonacceptance decision is performed again.

In the above description, one of the plurality of devices is the biometric authentication device 10. Each of the plurality of devices may be a biometric authentication device 10. In that case, adjustment may be performed among device linking units 27 of the plurality of biometric authentication devices 10, and one biometric authentication device 10 may carry out the processing representatively.

*Effect of Embodiment 4*

As described above, the biometric authentication device 10 according to Embodiment 4 confirms linking with another device and decides about continuation acceptance or nonacceptance. This can reinforce legitimacy of the biometric information.

Note that "unit" in the above description may be changed to "circuit", "stage", "procedure", "process", or "processing circuitry".

Embodiments and modifications of the present disclosure have been described so far. Several ones of these embodiments and modifications may be practiced in combination. One or several ones of the embodiments and modifications may be practiced partly. The present disclosure is not limited to the above embodiments and modifications, and various changes can be made as necessary.

REFERENCE SIGNS LIST

10: biometric authentication device; 11: processor; 12: memory; 13: auxiliary storage device; 14: sensor interface; 15: display interface; 16: communication interface; 17: sensor; 21: measuring unit; 22: authentication processing unit; 23: continuation processing unit; 24: legitimacy verification unit; 25: key management unit; 26: re-authentication processing unit; 27: device linking unit.

The invention claimed is:

1. A biometric authentication device comprising processing circuitry configured
to measure biometric information,
to generate authentication information that differs depending on an individual living body from first biometric information being the measured biometric information, and to compare the authentication information with a first template being set in advance, to decide authentication acceptance or nonacceptance on a basis of the authentication information, using a method,
to decide about continuation acceptance or nonacceptance by a method different from the method employed in decision of the authentication acceptance or nonacceptance, the processing circuitry repeatedly making decisions about the continuation acceptance or nonacceptance of an authentication state, using second biometric information being the biometric information which is measured in the authentication state where authentication acceptance is decided,
to guarantee legitimacy of the biometric information on a basis of results of repeated decisions of the continuation acceptance or nonacceptance;
to compare the authentication information with the first template being set in advance, to decide the authentication acceptance or nonacceptance, and to set the authentication information as a second template if authentication acceptance is decided;

to generate continuation information from the second biometric information and to compare the continuation information with the second template, to decide the continuation acceptance or nonacceptance, and to update a continuation template with the continuation information if continuation acceptance is decided; and at a certain timing, to compare the continuation information with the first template instead of the second template, to decide the continuation acceptance or nonacceptance.

2. The biometric authentication device according to claim 1, wherein the processing circuitry extracts a feature from the first biometric information to generate the authentication information, and extracts, from the second biometric information, a feature that differs in contents or in number from the extracted feature, to generate the continuation information, and decides continuation acceptance or nonacceptance on a basis of the continuation information.

3. The biometric authentication device according to claim 1, wherein the processing circuitry is configured to generate the authentication information from information covering a first period out of the first biometric information, and generate the continuation information from information covering a second period that is different from the first period out of the second biometric information.

4. The biometric authentication device according to claim 1, wherein the processing circuitry is configured to decide the continuation acceptance or nonacceptance by utilizing non-cyclical information resulting from at least either a user of an acquisition source of the second biometric information or a device used for acquisition of the second biometric information, the non-cyclical information being obtained for superposing on the second biometric information.

5. The biometric authentication device according to claim 4, wherein the processing circuitry is further configured to compare the authentication information with the first template, to decide the authentication acceptance or nonacceptance, and at the certain timing, generate continuation information from the second biometric information and compare the continuation information with the first template, so as to decide the continuation acceptance or nonacceptance.

6. The biometric authentication device according to claim 1, wherein the processing circuitry is further configured to, when authentication acceptance is decided, transmit information generated using a first key, and when continuation acceptance is decided, transmit information generated using a second key different from the first key.

7. The biometric authentication device according to claim 1, wherein the processing circuitry is configured to manage keys per biometric condition, and in a case where authentication acceptance is decided, transmit information generated using a key, among the keys, corresponding to a biometric condition satisfied by the second biometric information.

8. The biometric authentication device according to claim 1, wherein the processing circuitry is configured to, when a re-authentication condition is satisfied in the authentication state, generate re-authentication information that differs depending on an individual living body from third biometric information, and decide re-authentication acceptance or nonacceptance on a basis of the re-authentication information.

9. The biometric authentication device according to claim 1, wherein the processing circuitry is configured to confirm linking among a plurality of devices, and in a case where linking is confirmed, decide continuation acceptance or nonacceptance using the second biometric information measured using at least one of the plurality of devices.

10. A biometric authentication method comprising:

measuring biometric information;

generating authentication information that differs depending on an individual living body from first biometric information being the measured biometric information, and comparing the authentication information with a first template being set in advance, thereby deciding authentication acceptance or nonacceptance on a basis of the authentication information;

deciding about continuation acceptance or nonacceptance of an authentication state, repeatedly by a method different from a method employed in decision of the authentication acceptance or nonacceptance, using second biometric information being the biometric information which is measured in the authentication state where authentication acceptance is decided;

guaranteeing legitimacy of the biometric information on a basis of results of repeated decisions of the continuation acceptance or nonacceptance;

comparing the authentication information with the first template being set in advance, to decide the authentication acceptance or nonacceptance, and setting the authentication information as a second template if authentication acceptance is decided;

generating continuation information from the second biometric information and comparing the continuation information with the second template, deciding the continuation acceptance or nonacceptance, and updating a continuation template with the continuation information if continuation acceptance is decided; and at a certain timing, comparing the continuation information with the first template instead of the second template, to decide the continuation acceptance or nonacceptance.

11. A non-transitory computer readable medium storing a biometric authentication program which when executed by a processor causes the processor to:

measure biometric information;

generate authentication information that differs depending on an individual living body from first biometric information being the biometric information measured, and compare the authentication information with a first template being set in advance, thereby deciding authentication acceptance or nonacceptance on a basis of the authentication information;

decide about continuation acceptance or nonacceptance by a method different from a method employed in decision of the authentication acceptance or nonacceptance made, repeatedly make decisions about the continuation acceptance or nonacceptance of an authentication state, using second biometric information being the biometric information which is measured in the authentication state where authentication acceptance is decided; and guarantee legitimacy of the biometric information on a basis of results of repeated decisions of the continuation acceptance or nonacceptance;

compare the authentication information with the first template being set in advance, to decide the authentication acceptance or nonacceptance, and to set the authentication information as a second template if authentication acceptance is decided;

to generate continuation information from the second biometric information and to compare the continuation information with the second template, to decide the continuation acceptance or nonacceptance, and to update a continuation template with the continuation information if continuation acceptance is decided; and at a certain timing, to compare the continuation information with the first template instead of the second template, to decide the continuation acceptance or nonacceptance.

\* \* \* \* \*